United States Patent
Konegawa et al.

(10) Patent No.: US 11,300,733 B2
(45) Date of Patent: Apr. 12, 2022

(54) OPTICAL WAVEGUIDE MEMBER CONNECTOR AND PRODUCING METHOD THEREOF

(71) Applicant: NITTO DENKO CORPORATION, Osaka (JP)

(72) Inventors: Naoto Konegawa, Osaka (JP); Yuichi Tsujita, Osaka (JP); Mineyoshi Hasegawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/756,255

(22) PCT Filed: Oct. 19, 2018

(86) PCT No.: PCT/JP2018/038984
§ 371 (c)(1),
(2) Date: Apr. 15, 2020

(87) PCT Pub. No.: WO2019/082805
PCT Pub. Date: May 2, 2019

(65) Prior Publication Data
US 2020/0249400 A1    Aug. 6, 2020

(30) Foreign Application Priority Data
Oct. 23, 2017    (JP) .............................. JP2017-204438

(51) Int. Cl.
*G02B 6/38*    (2006.01)
*G02B 6/36*    (2006.01)
(Continued)

(52) U.S. Cl.
CPC ................ *G02B 6/36* (2013.01); *G02B 6/13* (2013.01); *G02B 6/3855* (2013.01); *G02B 6/3885* (2013.01); *G02B 6/10* (2013.01)

(58) Field of Classification Search
None
See application file for complete search history.

(56) References Cited

U.S. PATENT DOCUMENTS 8,821,033 B2 *   9/2014   Rosenberg ........... G02B 6/3839
                                                         385/70
2008/0144999 A1   6/2008   Takeda et al.
(Continued)

FOREIGN PATENT DOCUMENTS

| CN | 103901552 A | 7/2014 |
| CN | 105633313 A | 6/2016 |

(Continued)

OTHER PUBLICATIONS

International Search Report Issued in PCT/JP2018/038984 dated Jan. 15, 2019.
(Continued)

*Primary Examiner* — Michelle R Connelly
(74) *Attorney, Agent, or Firm* — Edwards Neils LLC; Jean C. Edwards, Esq.

(57) ABSTRACT

An optical waveguide member connector kit includes an optical waveguide member including an optical waveguide and a connector accommodating the optical waveguide member. The connector includes a main body having a bottom wall, and a first wall and a second wall that extend from the bottom wall toward one side in a thickness direction of the bottom wall and face each other at spaced intervals therebetween, and a lid disposed between the first wall and the second wall and sandwiching the optical waveguide member with the bottom wall when the optical waveguide member is accommodated in the connector. A ratio (L1/L2) of a length L1 in a facing direction of the lid to a facing length L2 between the first wall and the second wall is 0.80 or more and 0.99 or less.

5 Claims, 14 Drawing Sheets

(51) Int. Cl.
*G02B 6/10* (2006.01)
*G02B 6/13* (2006.01)

(56) References Cited

U.S. PATENT DOCUMENTS

| | | |
|---|---|---|
| 2010/0278485 A1 | 11/2010 | Nakagawa et al. |
| 2012/0014648 A1 | 1/2012 | Duis et al. |
| 2014/0147083 A1 | 5/2014 | Nakagawa et al. |
| 2015/0234129 A1 | 8/2015 | Akabane et al. |
| 2015/0301290 A1* | 10/2015 | Fujiwara .............. G02B 6/3838 385/83 |
| 2016/0149175 A1 | 5/2016 | Morimitsu et al. |
| 2016/0154188 A1* | 6/2016 | Nakagawa ........... G02B 6/3861 385/80 |
| 2016/0223760 A1 | 8/2016 | Moriyama et al. |
| 2018/0199457 A1 | 7/2018 | Cheng |
| 2018/0314012 A1* | 11/2018 | Gsell ................... G02B 6/3839 |
| 2021/0033786 A1 | 2/2021 | Konegawa et al. |

FOREIGN PATENT DOCUMENTS

| | | |
|---|---|---|
| CN | 106843390 A | 6/2017 |
| CN | 110476098 A | 11/2019 |
| JP | H08-094856 A | 4/1996 |
| JP | H09-105838 A | 4/1997 |
| JP | 2002-040298 A | 2/2002 |
| JP | 2006-163210 A | 6/2006 |
| JP | 2008-151843 A | 7/2008 |
| JP | 2012-247732 A | 12/2012 |
| JP | 2014-048532 A | 3/2014 |
| JP | 2014-106409 A | 6/2014 |
| JP | 2014-130335 A | 7/2014 |
| JP | 2014-191055 A | 10/2014 |
| JP | 2015-155969 A | 8/2015 |
| JP | 2016-142951 A | 8/2016 |

OTHER PUBLICATIONS

Written Opinion Issued in PCT/JP2018/038984 dated Jan. 15, 2019.
Office Action, issued by the State Intellectual Property Office dated Jul. 9, 2021, in connection with Chinese Patent Application No. 201880067521.5.
Office Action, issued by the Japanese Patent Office dated Nov. 24, 2021, in connection with Japanese Patent Application No. 2017-204438.

* cited by examiner

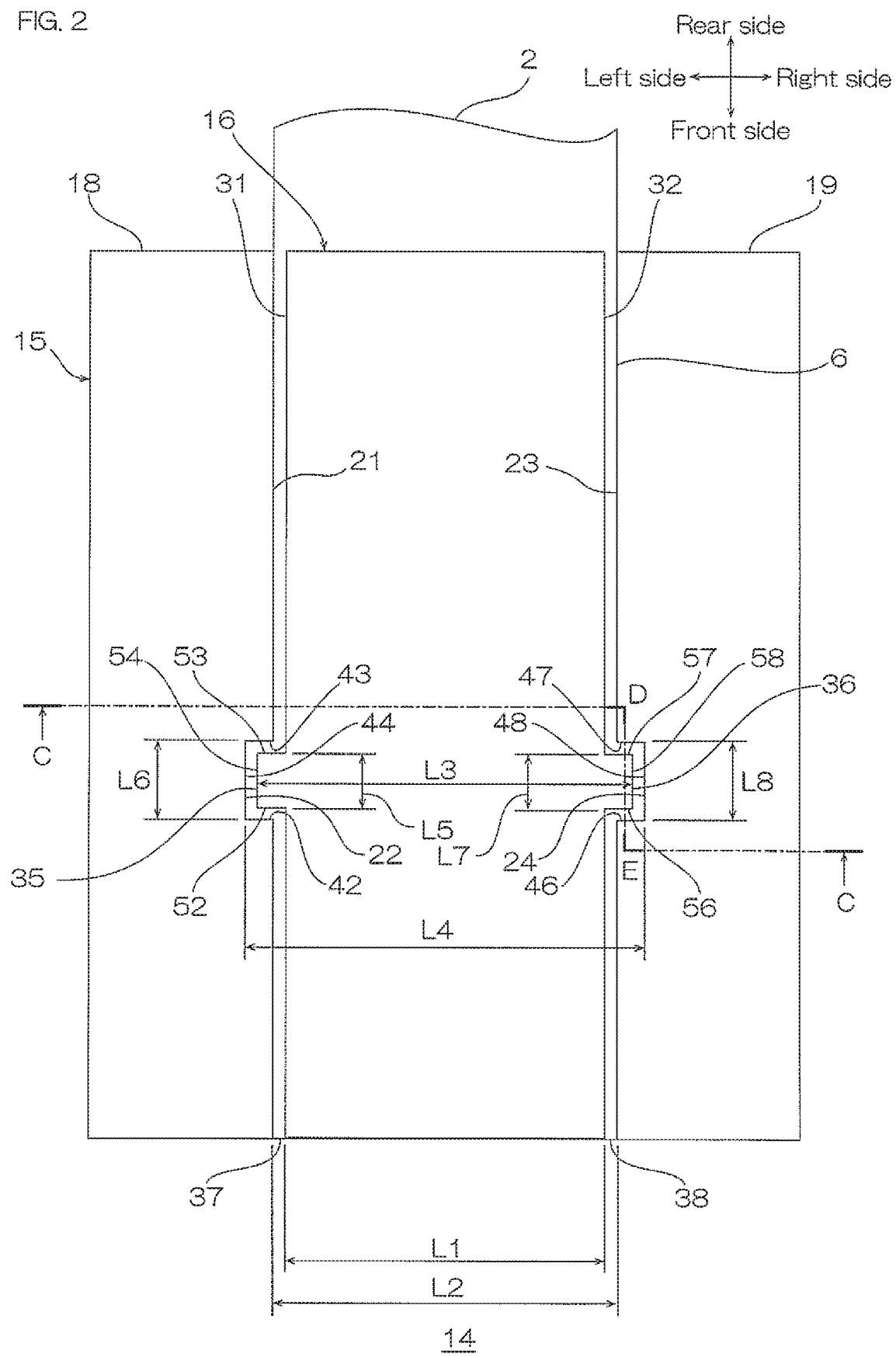

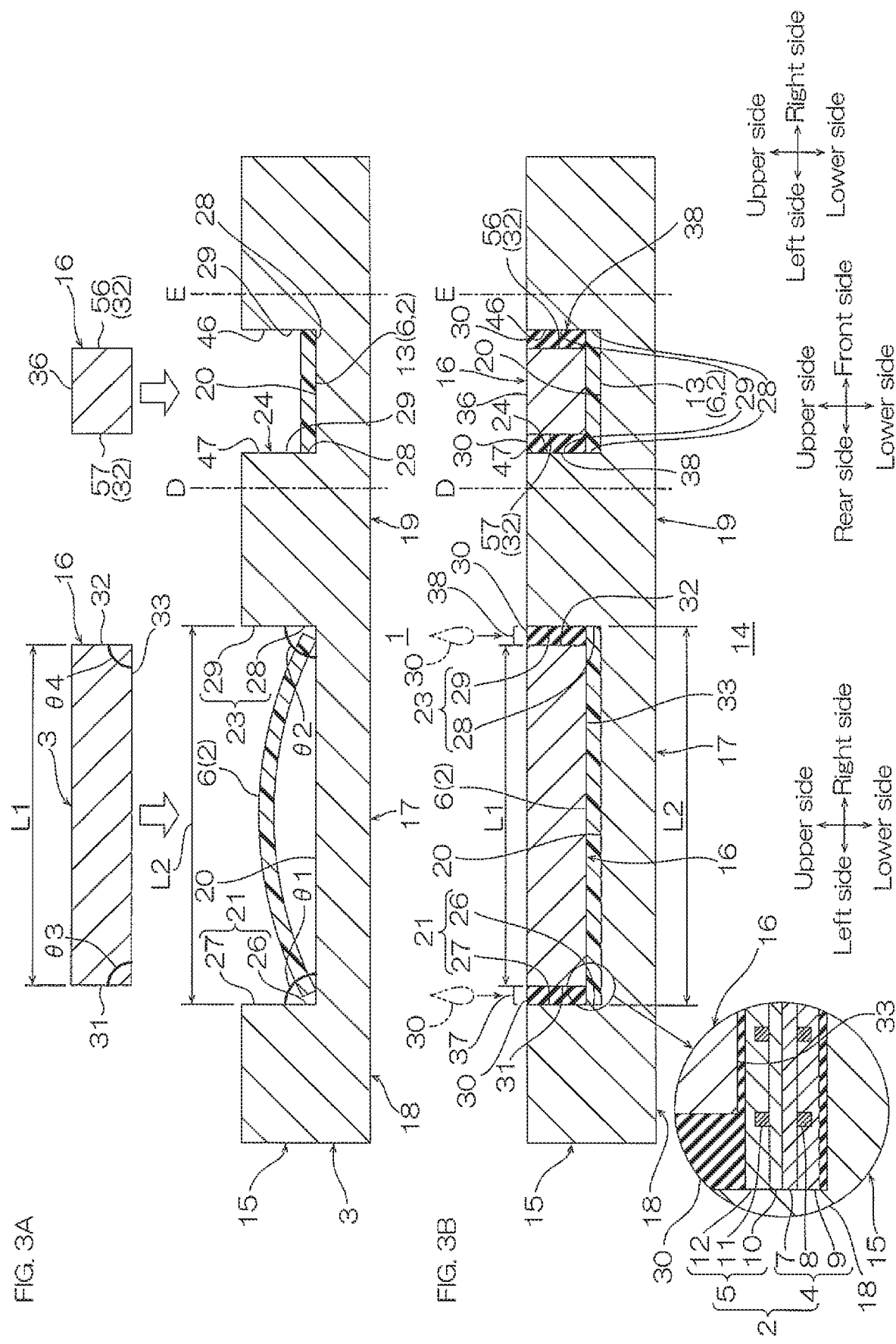

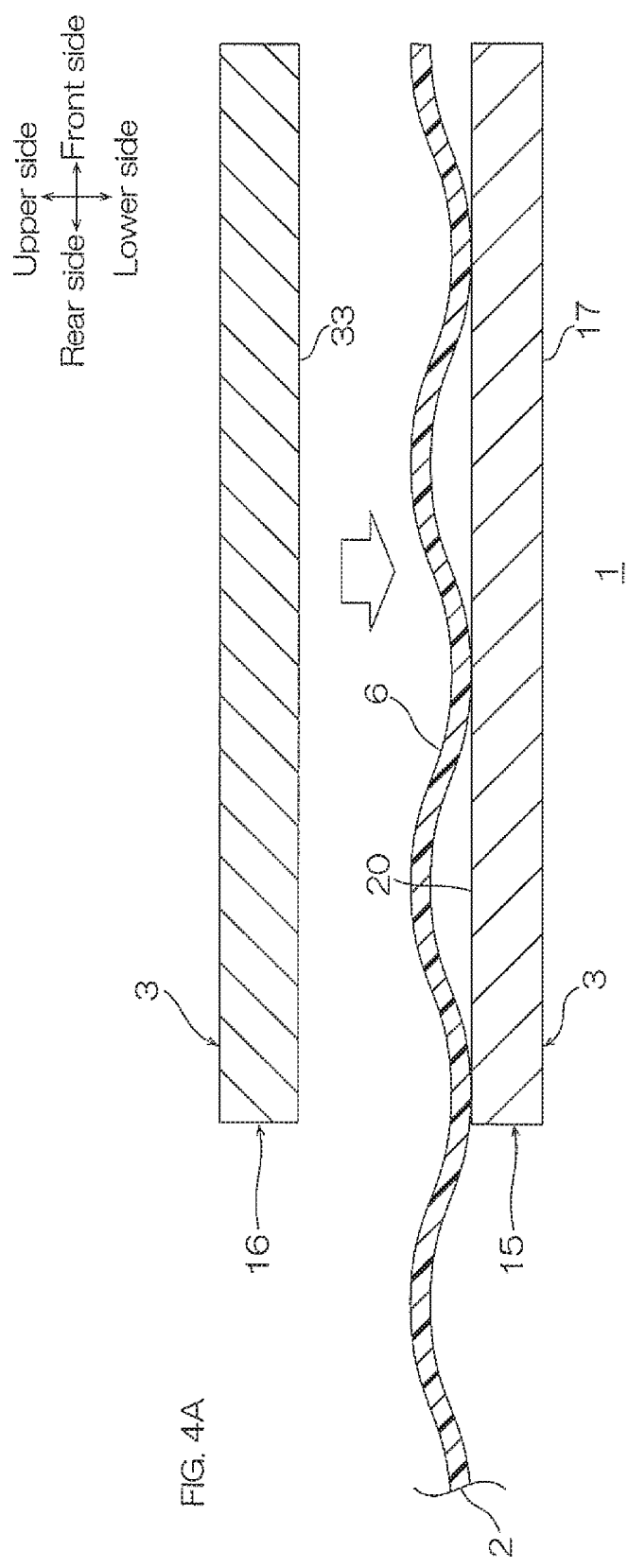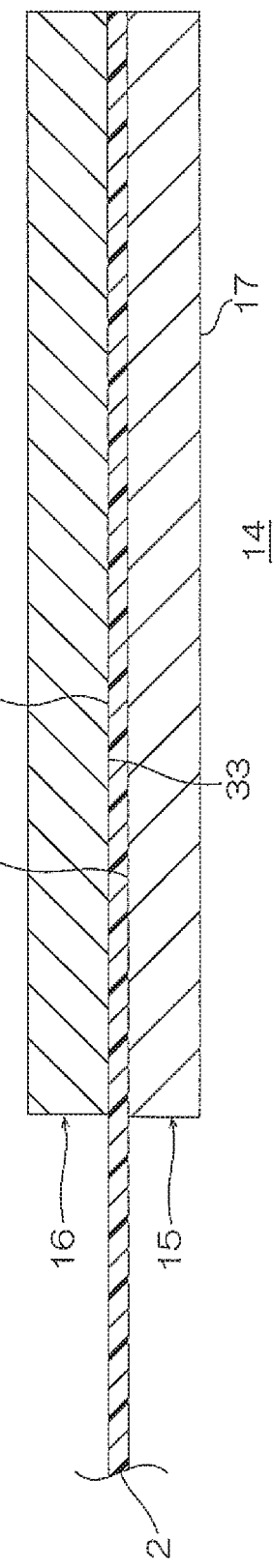

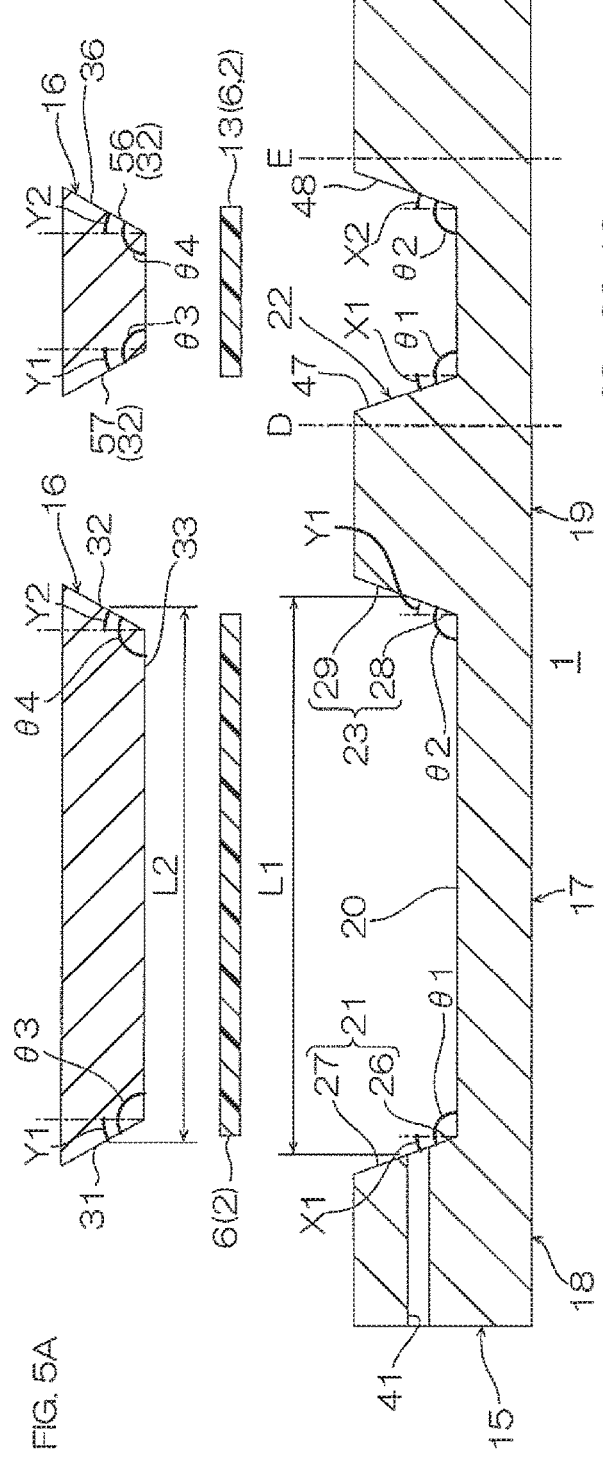

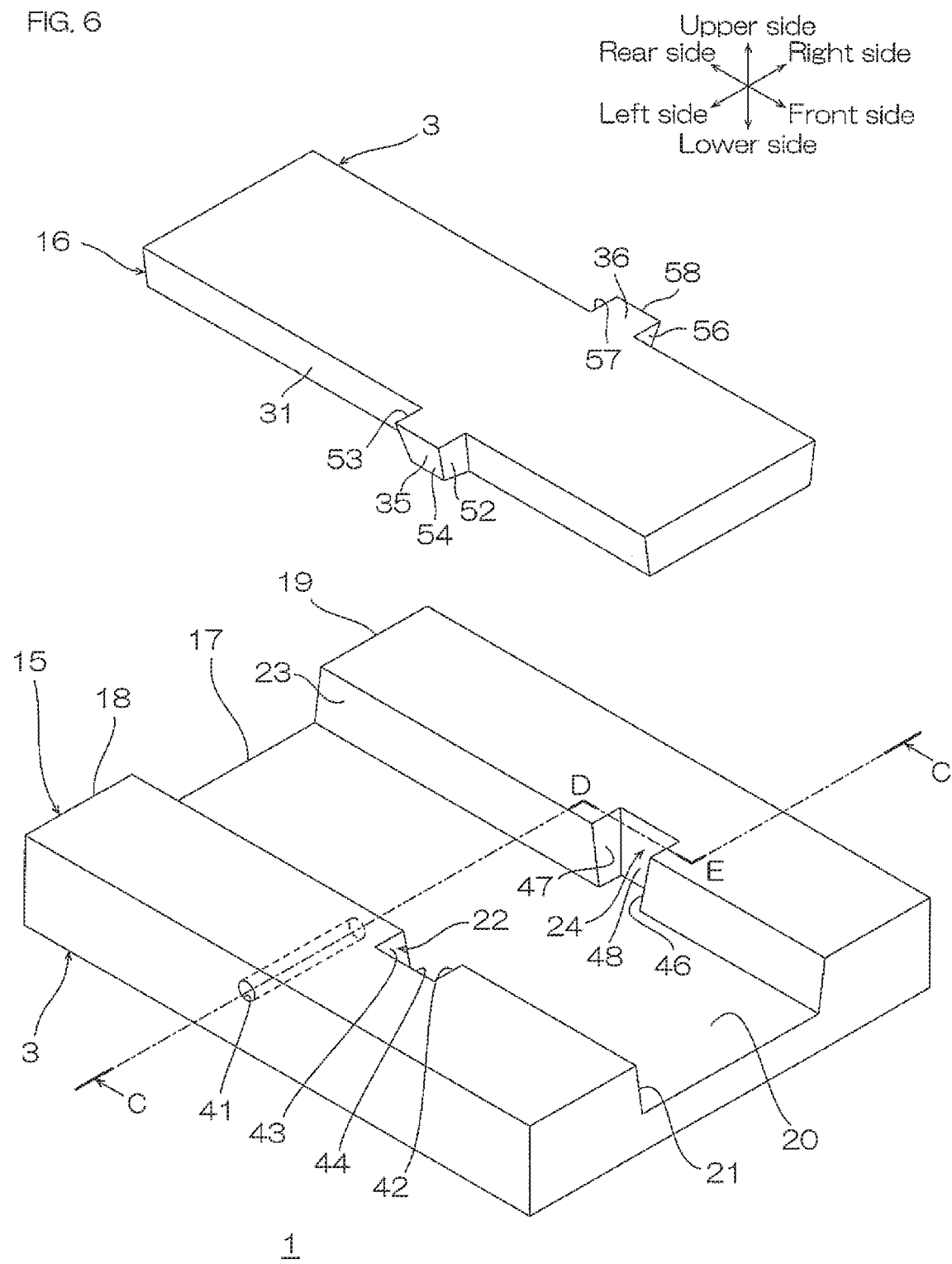

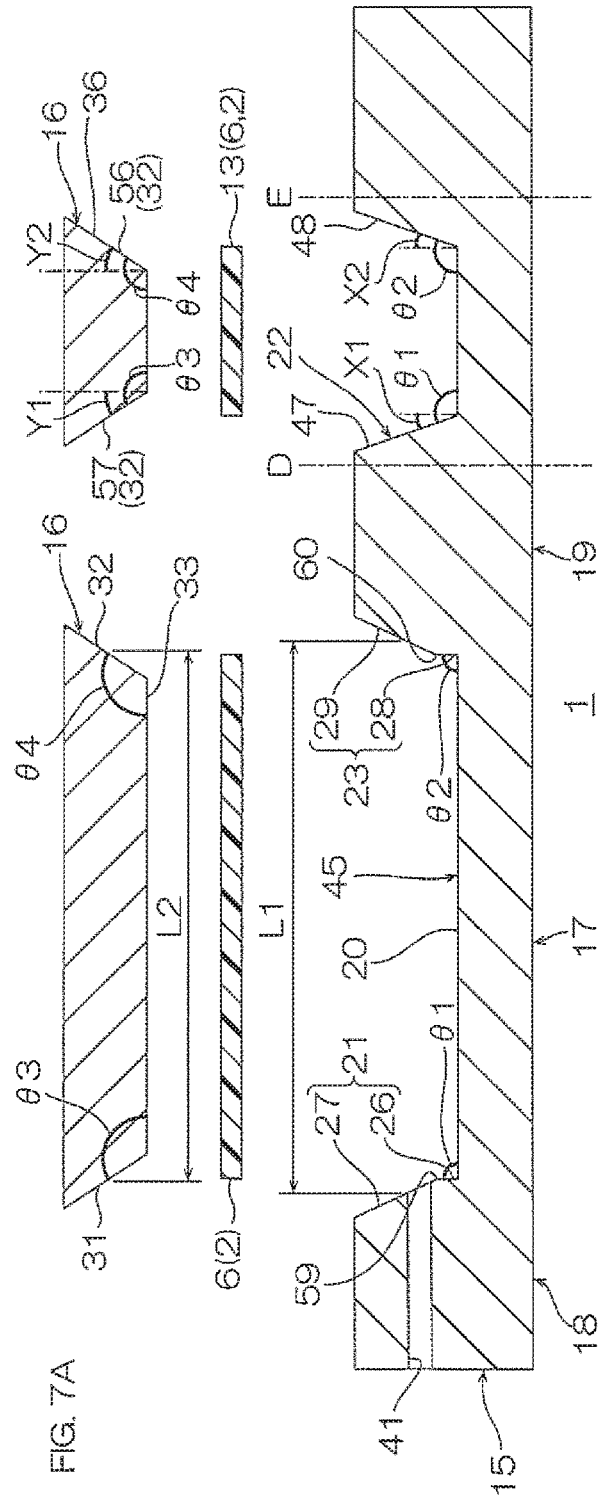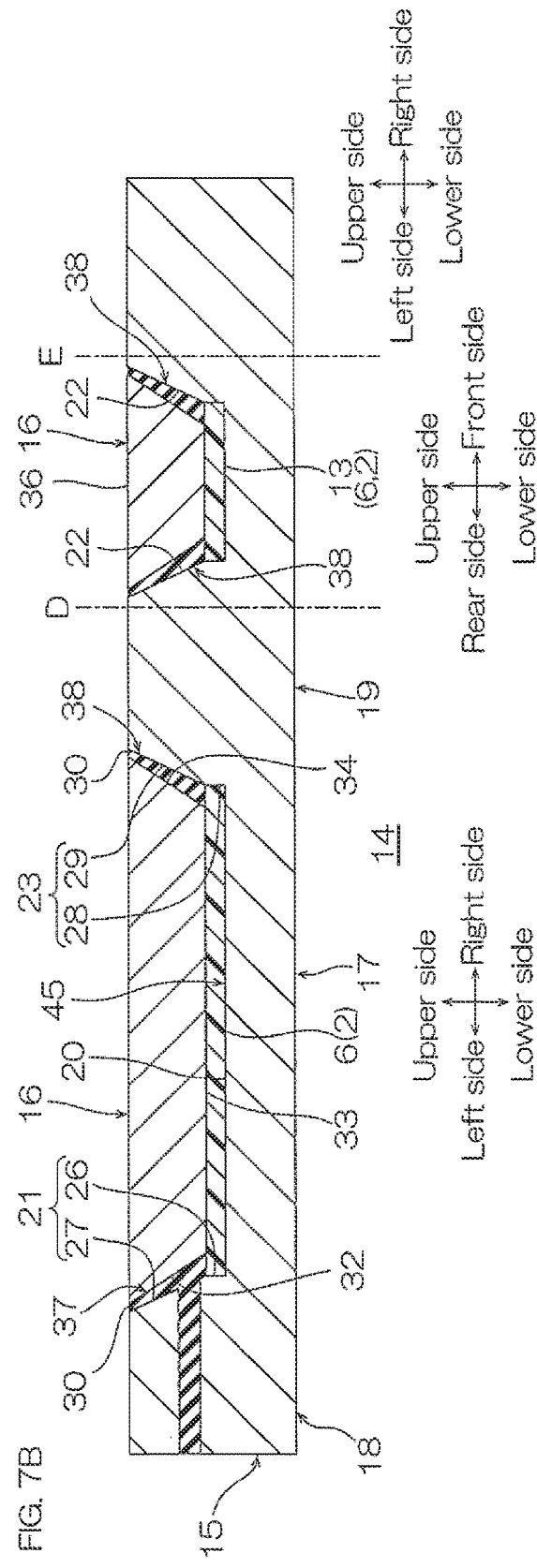
FIG. 7A
FIG. 7B

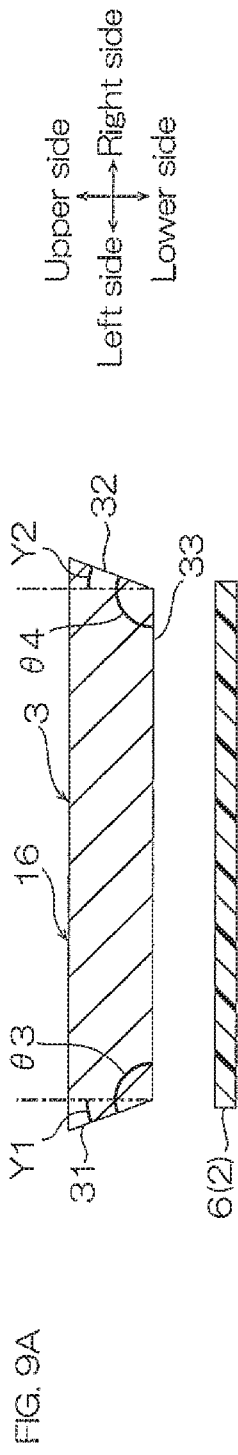
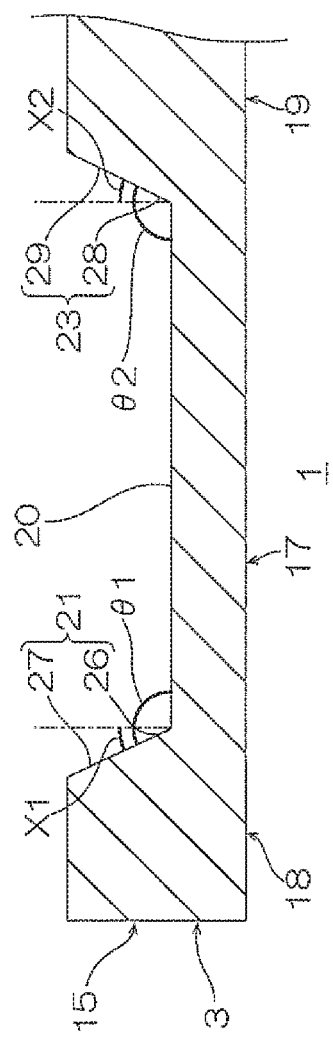

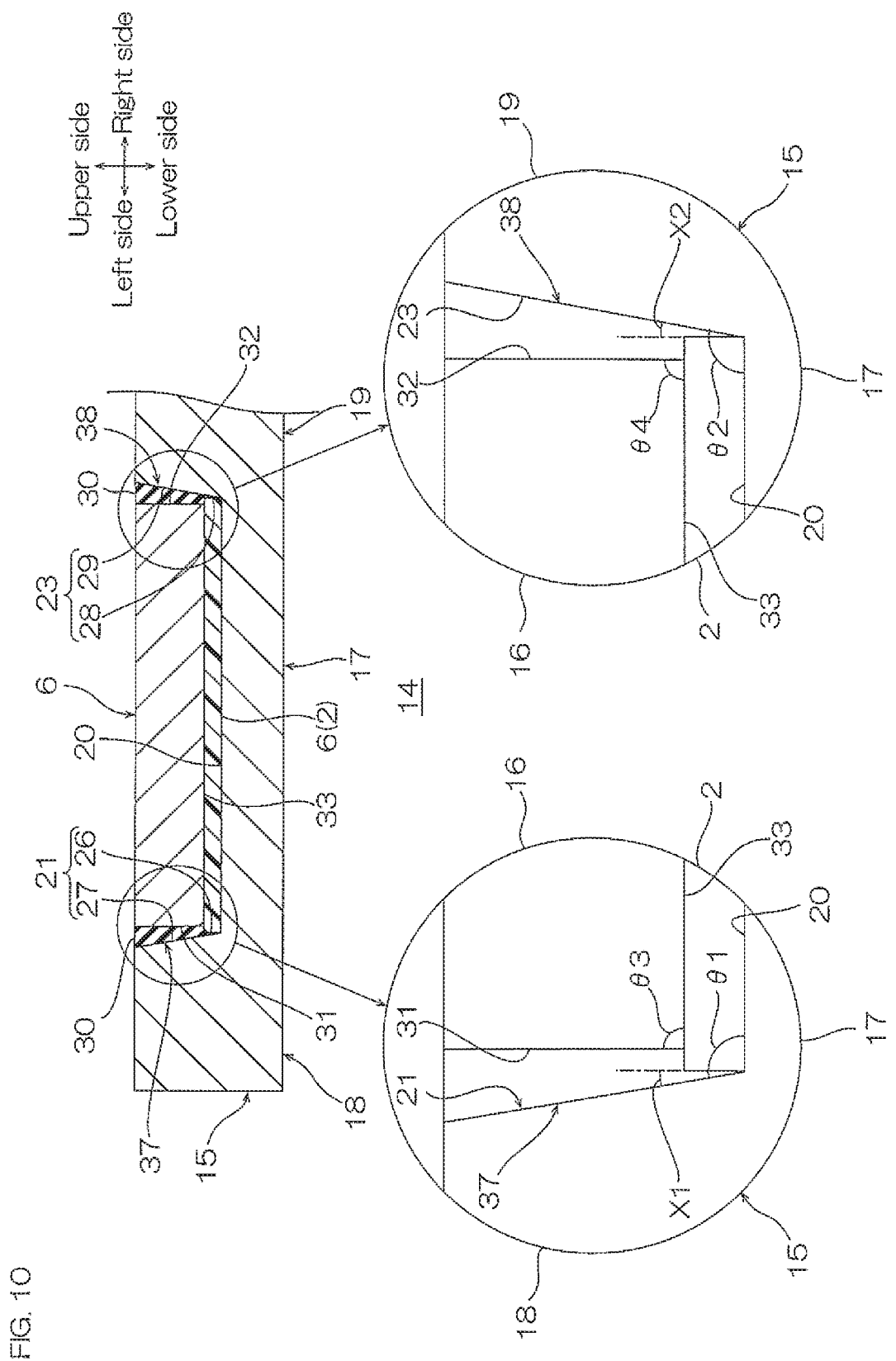

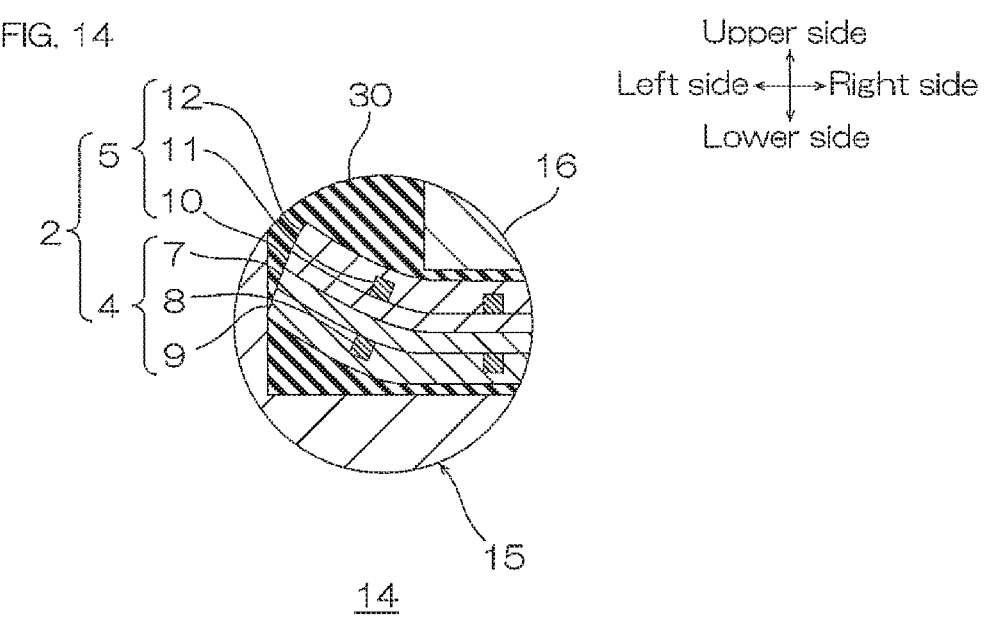

OPTICAL WAVEGUIDE MEMBER CONNECTOR AND PRODUCING METHOD THEREOF

CROSS-REFERENCE TO RELATED APPLICATIONS

The present application is a 35 U.S.C. 371 National Stage Entry of PCT/JP2018/038984, filed on Oct. 19, 2018, which claims priority from Japanese Patent Application No. 2017-204438, filed on Oct. 23, 2017, the contents of all of which are herein incorporated by reference in their entirety.

TECHNICAL FIELD

The present invention relates to an optical waveguide member connector and a producing method thereof.

BACKGROUND ART

Conventionally, it has been known that an optical waveguide connector is produced by accommodating an optical waveguide in a connector.

A PMT optical connector including an optical waveguide in a flat plate shape, and a ferrule for a PMT optical connector provided with a PMT main body portion having an opening portion in a recessed ditch shape and a PMT lid portion has been proposed (ref: for example, the following Patent Document 1).

In Patent Document 1, the optical waveguide is mounted on the opening portion in the PMT main body portion, and subsequently, the PMT lid portion is pushed from the upper portion of the optical waveguide to be then adhesively fixed to the PMT main body portion, thereby configuring the PMT optical connector.

CITATION LIST

Patent Document

Patent Document 1: Japanese Unexamined Patent Publication No. 2012-247732

SUMMARY OF THE INVENTION

Problem to be Solved by the Invention

When a width of the opening portion of the PMT main body portion is the same as that of the PMT lid portion, there is a disadvantage that an end portion in a width direction of the PMT lid portion is brought into contact with an inner end of a free end portion (upper end portion) of the PMT main body portion, and thus, the PMT lid portion cannot be fitted into the opening portion in the PMT main body portion.

To solve the disadvantage, it is considered that the width of the PMT lid portion is set slightly smaller than that of the opening portion in the PMT main body portion. In the conventional setting, the set value is 99.3%±0.1%. However, an attempt to carry out the above-described fitting by automatic operation with a machine instead of manual operation by an operator has been recently made. In such a case, there is a disadvantage that with the above-described width of the opening portion in the PMT main body portion, the above-described contact yet occurs, and thus, the PMT lid portion cannot be fitted into the opening portion in the PMT main body portion.

Meanwhile, when the width of the PMT lid portion is set greatly small compared to that of the opening portion in the PMT main body portion, the above-described contact does not occur by the automatic operation with the machine, and thus, the PMT lid portion can be fitted into the opening portion in the PMT main body portion. However, a core of the optical waveguide may be disposed in the end portion in the width direction thereof. In this case, the end portion in the width direction of the optical waveguide is not pushed toward the PMT lid portion, and thus, floats upwardly. As a result, there is a disadvantage that optical connecting accuracy of the core in the end portion of the optical waveguide is reduced.

The present invention provides an optical waveguide member connector that is capable of surely fitting a lid between a first wall and a second wall and having excellent optical connecting accuracy of an optical waveguide member, and a method for producing an optical waveguide member connector.

Means for Solving the Problem

The present invention (1) includes an optical waveguide member connector kit including an optical waveguide member including an optical waveguide and a connector accommodating the optical waveguide member, wherein the connector includes a main body having a bottom wall, and a first wall and a second wall that extend from the bottom wall toward one side in a thickness direction of the bottom wall and face each other at spaced intervals therebetween, and a lid disposed between the first wall and the second wall and sandwiching the optical waveguide member with the bottom wall when the optical waveguide member is accommodated in the connector; and a ratio (L1/L2) of a length L1 in a facing direction of the lid to a facing length L2 between the first wall and the second wall is 0.80 or more and 0.99 or less.

In the optical waveguide member connector kit, the ratio (L1/L2) is 0.99 or less, so that the lid can be surely fitted between the first wall and the second wall by automatic operation with a machine.

Meanwhile, in the optical waveguide member connector kit, the ratio (L1/L2) is 0.80 or more, so that the end portion in the facing length of the optical waveguide member can be surely sandwiched between the lid and the bottom wall. Thus, floating of the end portion of the optical waveguide member can be suppressed, and optical connecting accuracy of the optical waveguide member is excellent.

The present invention (2) includes the optical waveguide member connector kit described in (1), wherein when the lid is disposed between the first wall and the second wall, a first gap is formed between the lid and the first wall, and the cross-sectional area along the facing direction of the first gap increases as it gets closer to the bottom wall and/or when the lid is disposed between the first wall and the second wall, a second gap is formed between the lid and the second wall, and the cross-sectional area along the facing direction of the second gap increases as it gets closer to the bottom wall.

In the optical waveguide member connector kit, when an adhesive fills the first gap and/or the second gap, the cross-sectional area along the facing direction of the gap increases as it gets closer to the bottom wall, so that a filling amount of the adhesive near the optical waveguide member can be increased. Thus, the optical waveguide member can be more surely adhesively fixed to the main body.

The present invention (3) includes the optical waveguide member connector kit described in (1), wherein when the lid is disposed between the first wall and the second wall, a first gap is formed between the lid and the first wall, and the cross-sectional area along the facing direction of the first gap decreases as it gets closer to the bottom wall and/or when the lid is disposed between the first wall and the second wall, a second gap is formed between the lid and the second wall, and the cross-sectional area along the facing direction of the second gap decreases as it gets closer to the bottom wall.

In the optical waveguide member connector kit, the cross-sectional area along the facing direction of the first gap and/or the second gap decreases as it gets closer to the bottom wall, that is, the cross-sectional area along the facing direction thereof increases as it goes away from the bottom wall. Thus, in the first gap and/or the second gap, the cross-sectional area of the end edge at the side of going away from the bottom wall can be set large, and as a result, an adhesive can be easily and surely poured from the above-described end edge.

The present invention (4) includes the optical waveguide member connector kit described in any one of (1) to (3), wherein when the lid is disposed between the first wall and the second wall, each of the first wall and the second wall has a first facing surface and a second facing surface facing the lid; the lid has a third facing surface facing the first facing surface and a fourth facing surface facing the second facing surface; and at least one of the first facing surface, the second facing surface, the third facing surface, and the fourth facing surface inclines with respect to the thickness direction.

In the optical waveguide member connector kit, at least one facing surface of the first facing surface, the second facing surface, the third facing surface, and the fourth facing surface inclines with respect to the thickness direction, so that when an adhesive is disposed between the first facing surface and the third facing surface that face each other, or between the second facing surface and the fourth facing surface that face each other, the adhesive area of the adhesive with the one facing surface can be increased compared to a case without inclination. Thus, more reliable fixing of the connector with respect to the optical waveguide member can be achieved.

The present invention (5) includes the optical waveguide member connector kit described in (4), wherein the first facing surface and the third facing surface incline outwardly in the facing direction as they extend toward one side in the thickness direction, and an inclination X1 of the first facing surface with respect to the thickness direction is smaller than an inclination Y1 of the third facing surface with respect to the thickness direction, and/or the second facing surface and the fourth facing surface incline outwardly in the facing direction as they extend toward one side in the thickness direction, and an inclination X2 of the second facing surface with respect to the thickness direction is smaller than an inclination Y2 of the fourth facing surface with respect to the thickness direction.

In the optical waveguide member connector kit, the first facing surface and the third facing surface incline outwardly in the facing direction as they extend toward one side in the thickness direction, so that the contact area of the first facing surface and the third facing surface with the adhesive can be increased, while the lid can be surely disposed between the first wall and the second wall. Furthermore, the inclination X1 of the first facing surface is smaller than the inclination Y1 of the third facing surface, so that the cross-sectional area of the first gap formed therebetween increases toward the optical waveguide member. Thus, a filling amount of the adhesive near the optical waveguide member can be increased. As a result, the optical waveguide member can be more surely adhesively fixed to the main body.

The second facing surface and the fourth facing surface incline outwardly in the facing direction as they extend toward one side in the thickness direction, so that the contact area of the second facing surface and the fourth facing surface with the adhesive can be increased, while the lid can be surely disposed between the first wall and the second wall. Furthermore, the inclination X2 of the second facing surface is smaller than the inclination Y2 of the fourth facing surface, so that the cross-sectional area of the second gap formed therebetween increases toward the optical waveguide member. Thus, a filling amount of the adhesive near the optical waveguide member can be increased. As a result, the optical waveguide member can be more surely adhesively fixed to the main body.

As a result, fitting properties of the lid with respect to the main body are improved, and the optical waveguide member can be more surely adhesively fixed to the main body by the adhesive.

The present invention (6) includes the optical waveguide member connector kit described in (5), wherein the first facing surface and the second facing surface incline outwardly in the facing direction as they extend toward one side in the thickness direction; the first wall has a first continuous surface continuous to the bottom surface of the bottom wall and the first facing surface, and along the thickness direction; the second wall has a second continuous surface continuous to the bottom surface of the bottom wall and the second facing surface, and along the thickness direction; the first continuous surface, the second continuous surface, and the bottom surface form a recessed portion that is recessed from the first facing surface and the second facing surface toward the other side in the thickness direction; and when the optical waveguide member is accommodated in the recessed portion, the first continuous surface and the second continuous surface face the optical waveguide member in the facing direction.

According to the optical waveguide member connector kit, the optical waveguide member can be accommodated in the recessed portion to be fitted therein so that the first continuous surface and the second continuous surface face the optical waveguide member in the facing direction. Thus, the optical waveguide member can be sandwiched between the lid and the bottom wall in a state in which the optical waveguide member is fitted into the main body in advance. Thus, the optical waveguide member can be more surely fixed to the connector.

The present invention (7) includes a method for producing an optical waveguide member connector including in the optical waveguide member connector kit described in any one of (1) to (6) a first step of accommodating the optical waveguide member between the first wall and the second wall of the main body, a second step of sandwiching the optical waveguide member between the lid and the bottom wall, and a third step of pouring an adhesive into a first gap formed between the lid and the first wall and/or a second gap formed between the lid and the second wall.

According to the method for producing an optical waveguide member connector, the adhesive is poured into the first gap formed between the lid and the first wall and/or the second gap formed between the lid and the second wall, so that the optical waveguide member can surely adhere to the connector.

Effect of the Invention

In the optical waveguide member connector kit of the present invention, the lid can be surely fitted between the first wall and the second wall, so that optical connecting accuracy of the optical waveguide member is excellent.

In the method for producing an optical waveguide member connector of the present invention, the optical waveguide member can surely adhere to the connector.

BRIEF DESCRIPTION OF THE DRAWINGS

FIG. 2 shows a plan view of an optical waveguide member connector produced from the optical waveguide member connector kit shown in FIG. 1.

FIGS. 3A and 3B show production process views of an optical waveguide member connector:

FIG. 3A illustrating a cross-sectional view of the optical waveguide member connector kit along a C-C cutting line of FIG. 1 and FIG. 3B illustrating a cross-sectional view of the optical waveguide member connector along a C-C cutting line of FIG. 2.

FIGS. 4A and 4B show production process views of the optical waveguide member connector shown in FIG. 1:

FIG. 4A illustrating a side cross-sectional view of the optical waveguide member connector kit and FIG. 4B illustrating a side cross-sectional view of the optical waveguide member connector.

FIGS. 5A and 5B show production process views of an optical waveguide member connector of a second embodiment of the present invention:

FIG. 5A illustrating a cross-sectional view of an optical waveguide member connector kit and FIG. 5B illustrating a cross-sectional view of the optical waveguide member connector.

FIG. 6 shows a disassembled perspective view of the optical waveguide member connector kit shown in FIG. 5A.

FIGS. 7A and 7B show production process views of an optical waveguide member connector of a third embodiment of the present invention:

FIG. 7A illustrating a cross-sectional view of an optical waveguide member connector kit and FIG. 7B illustrating a cross-sectional view of the optical waveguide member connector.

FIGS. 9A and 9B show production process views of an optical waveguide member connector of a fourth embodiment of the present invention:

FIG. 9A illustrating a cross-sectional view of an optical waveguide member connector kit and FIG. 9B illustrating a cross-sectional view of the optical waveguide member connector.

FIG. 10 shows a front cross-sectional view of a modified example of the optical waveguide member connector of the third embodiment.

FIG. 14 shows a partially enlarged cross-sectional view of an optical waveguide member connector of a comparative example of the present invention.

DESCRIPTION OF EMBODIMENTS

Figure 1:
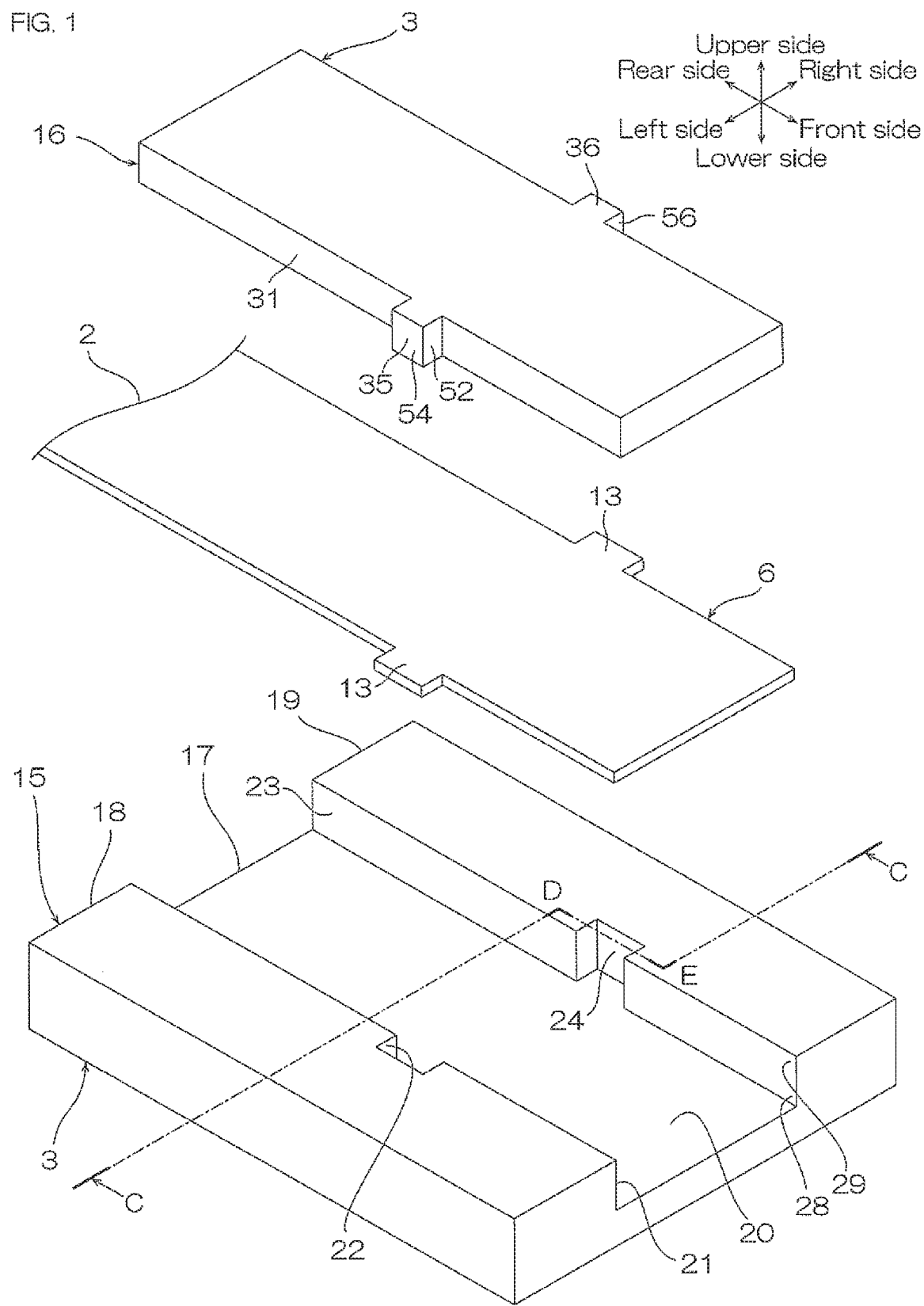
FIG. 1 shows a disassembled perspective view of a first embodiment of an optical waveguide member connector kit of the present invention.

In FIGS. 3A and 3B, the up-down direction on the plane of the sheet is an up-down direction (one example of a thickness direction, first direction), the upper side on the plane of the sheet is an upper side (one side in the thickness direction, one side in the first direction), and the lower side on the plane of the sheet is a lower side (the other side in the thickness direction, the other side in the first direction).

In a left-side portion of a D line and a right-side portion of an E line in FIGS. 3A and 3B, the right-left direction on the plane of the sheet is a right-left direction (width direction as one example of a facing direction, second direction perpendicular to the first direction). The left side on the plane of the sheet is a left side (one side in the width direction, one side in the second direction), and the right side on the plane of the sheet is a right side (the other side in the width direction, the other side in the second direction).

In a portion between the D line and the E line in FIGS. 3A and 3B, the right-left direction on the plane of the sheet is a front-rear direction (direction perpendicular to the thickness direction and the width direction, third direction perpendicular to the first direction and the second direction). The right side on the plane of the sheet is a front side (one side in the third direction), and the left side on the plane of the sheet is a rear side (the other side in the third direction).

To be specific, directions are in conformity with direction arrows of each view.

The definition of the directions does not mean to limit the directions at the time of the production and the use of an opto-electric hybrid board connector kit 1 and an opto-electric hybrid board connector 14 (described later).

As shown in FIGS. 1 to 3A, the opto-electric hybrid board connector kit 1 is a kit for producing the opto-electric hybrid board connector 14 as one example of an optical waveguide member connector by accommodating an opto-electric hybrid board 2 as one example of an optical waveguide member in a connector 3. To be specific, the connector kit 1 includes the opto-electric hybrid board 2 and the connector 3 as separate bodies.

The opto-electric hybrid board connector kit 1 is not a completed product and a set of a component of the opto-electric hybrid board connector 14, and the opto-electric hybrid board 2 and the connector 3 are sold as a set.

In the following description, the opto-electric hybrid board connector kit 1 may be simply referred to as the connector kit 1.

The opto-electric hybrid board 2 has a generally flat plate shape extending in the front-rear direction. The opto-electric hybrid board 2 has, for example, flexibility (flexible properties or plasticity). As shown in a partially enlarged view of FIG. 3B, the opto-electric hybrid board 2 sequentially includes an electric circuit board 4 and an optical waveguide 5 upwardly.

The electric circuit board 4 forms the lower surface of the opto-electric hybrid board 2. The electric circuit board 4 sequentially includes a base insulating layer 7, a conductive layer 8, and a cover insulating layer 9 downwardly. The electric circuit board 4 includes a metal supporting layer (not shown) made of a metal such as stainless steel as needed.

The base insulating layer 7 has a generally plate shape having the same shape as that of the electric circuit board 4 when viewed from the top. Examples of a material for the base insulating layer 7 include resins such as polyimide.

The plurality of conductive layers 8 are disposed in parallel at spaced intervals to each other in the right-left direction. Examples of a material for the conductive layer 8 include conductors such as copper.

The cover insulating layer 9 is a protecting layer that covers and protects the conductive layer 8. The material for the cover insulating layer 9 is the same as that for the base insulating layer 7. The cover insluting layer 9 has a generally plate shape having the same shape as that of the electric circuit board 4 when viewed from the top.

The electric circuit board 4 has a thickness of, for example, 10 μm or more, preferably 15 μm or more, and for example, 30 μm or less, preferably 20 μm or less.

The optical waveguide 5 forms the upper surface of the opto-electric hybrid board 2. The optical waveguide 5 is positioned on the electric circuit board 4. The optical waveguide 5 is a strip-type optical waveguide, and to be specific, sequentially includes an under clad layer 10, a core layer 11, and an over clad layer 12 upwardly.

The under clad layer 10 has a generally plate shape having the same shape as that of the optical waveguide 5 when viewed from the top. The under clad layer 10 is provided on the upper surface of the base insulating layer 7.

The core layer 11 is provided on the upper surface of the under clad layer 10. The plurality of core layers 11 are disposed at spaced intervals to each other in the width direction. The plurality of core layers 11 are also provided on both end portions in the right-left direction of the optical waveguide 5. Each of the plurality of core layers 11 has a linear shape along the front-rear direction. The core layer 11 has a mirror surface (not shown) in the rear end portion thereof.

The over clad layer 12 is provided on the upper surface of the under clad layer 10 so as to cover the core layer 11. The over clad layer 12 has a generally plate shape having the same shape as that of the under clad layer 10 when viewed from the top.

Examples of a material for the under clad layer 10, the core layer 11, and the over clad layer 12 include transparent resins such as epoxy resin. The refractive index of the core layer 11 is high with respect to that of the under clad layer 10 and the over clad layer 12. The optical waveguide 5 has a thickness of, for example, 10 μm or more, preferably 50 μm or more, and for example, 1000 μm or less, preferably 200 μm or less. The opto-electric hybrid board 2 has a thickness of, for example, 15 μm or more, preferably 55 μm or more, and for example, 1050 μm or less, preferably 220 μm or less.

As shown in FIGS. 1, 4A, and 4B, the front end portion of the opto-electric hybrid board 2 is defined as an accommodation portion 6 that is accommodated in the connector 3.

The accommodation portion 6 includes two board protruding portions 13 in which both side surfaces thereof in the right-left direction protrude toward both outer sides in the right-left direction. Each of the two board protruding portions 13 has a generally rectangular shape when viewed from the top. The accommodation portion 6 does not include the conductive layer 8 and the core layer 11, and includes the cover insulating layer 9, the base insulating layer 7, the underclad layer 10, and the over clad layer 12.

In the connector 3, the basic structure except for a size to be described next is, for example, the same as that of a PMT optical connector conforming to JPCA standard (detailed standard of PMT optical connector, JPCA-PE03-01-075-2006, Japan Electronics Packaging and Circuits).

The connector 3 includes a main body 15 and a lid 16 as separate bodies.

As shown in FIGS. 1 and 3A, the main body 15 has a U-shape when viewed from the front cross-sectional view having an opening upwardly. The main body 15 integrally includes a bottom wall 17, a first wall 18, and a second wall 19.

The bottom wall 17 has a generally rectangular flat plate shape extending in the front-rear direction. The bottom wall 17 has a bottom surface 20. The bottom surface 20 is the upper surface, and has a flat surface facing the upper side.

The first wall 18 and the second wall 19 extend from both end edges in the right-left direction of the bottom wall 17 upwardly, and face each other at spaced intervals therebetween in the right-left direction. Each of the first wall 18 and the second wall 19 has a generally rectangular flat plate shape extending in the up-down direction.

The first wall 18 has a first inner-side surface 21 that is continuous to the left end edge of the bottom surface 20. The first inner-side surface 21 faces the right side (inwardly in a facing direction), and has a flat surface extending in the front-rear direction. The first inner-side surface 21 has a generally linear shape when viewed from the top. The first inner-side surface 21 has a straight surface that is continuous to the left end edge of the bottom surface 20 at a right angle. That is, an angle θ1 made between the first inner-side surface 21 and the bottom surface 20 is the right angle. The first inner-side surface 21 continuously has a first lower portion 26 and a first upper portion 27. As shown in FIG. 3B, when the lid 16 is disposed between the first wall 18 and the second wall 19, the first upper portion 27 is one example of a first facing surface that faces the lid 16 in the right-left direction, and the first lower portion 26 is one example of a first continuous surface that is continuous to (connects) both of the bottom surface 20 of the bottom wall 17 and the first upper portion 27, and faces the opto-electric hybrid board 2.

As shown in FIG. 3A, when the lid 16 is not disposed between the first wall 18 and the second wall 19, the first lower portion 26 and the first upper portion 27 are not clearly distinguished, and a border therebetween does not exist. As shown in FIG. 2, furthermore, the first inner-side surface 21 has a first recessed portion 22 in which the central portion thereof in the front-rear direction is recessed toward the left side (outwardly in the facing direction). The first recessed portion 22 has a generally U-shape having an opening toward the right side. The first recessed portion 22 continuously has a first recessed front surface 42 and a first recessed rear surface 43 that are disposed to face at spaced intervals to each other in the front-rear direction, and a first left surface 44 that connects the left end edges of these.

The second wall 19 has a second inner-side surface 23 that is continuous to the right end edge of the bottom surface 20. The second inner-side surface 23 faces the left side, and has a flat surface extending in the front-rear direction. The second inner-side surface 23 has a generally linear shape when viewed from the top. As shown in FIG. 3A, the second inner-side surface 23 has a straight surface that is continuous to the right end edge of the bottom surface 20 at the right angle. That is, an angle θ2 made between the second inner-side surface 23 and the bottom surface 20 is the right angle. The second inner-side surface 23 has a second lower portion 28 and a second upper portion 29. As shown in FIG. 3B, when the lid 16 is disposed between the first wall 18 and the second wall 19, the second upper portion 29 is one example of a second facing surface that faces the lid 16 in the right-left direction, and the second lower portion 28 is one example of a second continuous surface that is continuous to (connects) both of the bottom surface 20 of the bottom wall 17 and the second upper portion 29, and faces the opto-electric hybrid board 2.

As shown in FIG. 3A, when the lid 16 is not disposed between the first wall 18 and the second wall 19, the second lower portion 28 and the second upper portion 29 are not clearly distinguished, and the border therebetween does not exist. As shown in FIG. 2, furthermore, the second inner-side surface 23 has a second recessed portion 24 in which the central portion thereof in the front-rear direction is recessed toward the right side. The second recessed portion 24 has a generally U-shape having an opening toward the left side. The second recessed portion 24 continuously has a second recessed front surface 46 and a second recessed rear surface 47 that are disposed to face at spaced intervals to each other in the front-rear direction, and a second right surface 48 that connects the right end edges of these.

A length in the up-down direction of the first inner-side surface 21 and a length in the up-down direction of the second inner-side surface 23 are, for example, the same; to be specific, are a length that is capable of accommodating the opto-electric hybrid board 2 and the lid 16; and to be more specific, are generally the same as the total sum of the length (thickness) in the up-down direction of the opto-electric hybrid board 2 and the length (thickness) in the up-down direction of the lid 16.

As shown in FIGS. 1 to 3A, the lid 16 has a generally flat plate shape extending in the front-rear direction. The lid 16 has a slightly smaller size (L1, the details are described later) than a facing length L2 between the first wall 18 and the second wall 19. The lid 16 integrally includes a first lid side surface 31, a second lid side surface 32, and a lid lower surface 33.

The first lid side surface 31 and the second lid side surface 32 face each other in the right-left direction and have a portion in parallel with each other. To be specific, the first lid side surface 31 and the second lid side surface 32 have a shape corresponding to the first inner-side surface 21 and the second inner-side surface 23 described above.

As shown in FIG. 3B, when the lid 16 is disposed between the first wall 18 and the second wall 19, the first lid side surface 31 is one example of a third facing surface that faces the first upper portion 27 in the right-left direction. As shown in FIG. 3A, an angle θ3 made between the first lid side surface 31 and the lid lower surface 33 is the right angle. As shown in FIG. 2, the first lid side surface 31 has a first protruding portion 35 in which the central portion thereof in the front-rear direction protrudes toward the left side. The first protruding portion 35 has a generally rectangular shape when viewed from the top. To be specific, the first protruding portion 35 has a shape corresponding to the first recessed portion 22, to be more specific, has a small similar shape with respect to the first recessed portion 22. The first protruding portion 35 continuously has a first protruding front surface 52 and a first protruding rear surface 53 that are disposed to face at spaced intervals to each other in the front-rear direction, and a first protruding left surface 54 that connects the left end edges of these.

As shown in FIG. 3B, when the lid 16 is disposed between the first wall 18 and the second wall 19, the second lid side surface 32 is one example of a fourth facing surface that faces the second upper portion 29 in the right-left direction. As shown in FIG. 3A, an angle θ4 made between the second lid side surface 32 and the lid lower surface 33 is the right angle. As shown in FIG. 2, the second lid side surface 32 has a second protruding portion 36 in which the central portion thereof in the front-rear direction protrudes toward the right side. The second protruding portion 36 has a generally rectangular shape when viewed from the top. To be specific, the second protruding portion 36 has a shape corresponding to the second recessed portion 24, to be more specific, has a small similar shape with respect to the second recessed portion 24. The second protruding portion 36 is overlapped with the first protruding portion 35 when projected in the right-left direction. The second protruding portion 36 continuously has a second protruding front surface 56 and a second protruding rear surface 57 that are disposed to face at spaced intervals to each other in the front-rear direction, and a second protruding right surface 58 that connects the right end edges of these.

As shown in FIG. 3A, the lid lower surface 33 connects the lower end edge of the first lid side surface 31 to that of the second lid side surface 32. The lid lower surface 33 has a flat surface along the front-rear direction and facing the lower side.

The connector 3 is, for example, hard, and to be specific, as described later, has toughness in which the lid 16 can be pushed toward the opto-electric hybrid board 2 and even when the lid 16 is pushed toward the main body 15, the deformation is suppressed.

A material for the connector 3 is not particularly limited as long as the above-described shape of the main body 15 and the lid 16 can be accurately molded, furthermore, the mechanical strength that can endure the pushing is achieved, and moreover, excellent connecting properties (compatibility) with respect to an adhesive 30 (described later) are achieved. Examples thereof include resin and metal. Preferably, a resin is used, more preferably, a hard resin is used.

(Size of Connector)

As shown in FIGS. 2 and 3A, a ratio of a length (L1/L2) of the length (width) L1 in the right-left direction of a portion other than the central portion in the front-rear direction of the lid 16 to the facing length (opening width) (length in the right-left direction) L2 of a portion other than the central portion in the front-rear direction between the first wall 18 and the second wall 19 is 0.80 or more, preferably 0.82 or more, more preferably 0.85 or more, further more preferably 0.86 or more, further more preferably 0.90 or more, further more preferably 0.92 or more, further more preferably 0.95 or more, further more preferably 0.96 or more, and 0.99 or less, preferably 0.98 or less, more preferably 0.97 or less.

When the ratio of the length (L1/L2) is below the above-described lower limit, in a second step (described later) of sandwiching the opto-electric hybrid board 2 between the lid 16 and the bottom wall 17, both end portions in the right-left direction of the opto-electric hybrid board 2 cannot be surely sandwiched. Thus, as shown in FIG. 14, both end portions in the right-left direction of the opto-electric hybrid board 2 deviate upwardly (float), and thus, optical connecting accuracy of the core layer 11 that is disposed in both end portions in the right-left direction of the opto-electric hybrid board 2 is reduced.

Meanwhile, when the ratio of the length (L1/L2) is above the above-described upper limit, a first step (described later) of disposing the opto-electric hybrid board 2 between the first wall 18 and the second wall 19 cannot be surely carried out. In automatic operation with a machine, in particular, it becomes apparent that the first step of disposing the opto-electric hybrid board 2 between the first wall 18 and the second wall 19 cannot be carried out.

The length L1 in the right-left direction of the lid 16 is the same in the entire portion other than the central portion in the front-rear direction. The length L2 in the right-left direction between the first wall 18 and the second wall 19 is the same in the entire portion other than the central portion in the front-rear direction. Accordingly, the length L1 in the right-left direction of the lid 16 and the length L2 in the right-left direction between the first wall 18 and the second wall 19 are adjusted so that a range of the above-described ratio of the length (L1/L2) is satisfied in any portion other than the central portion in the front-rear direction. For example, a ratio of the length L1 in the right-left direction of the front end portion of the lid 16 to the length L2 in the right-left direction of the front end portion between the first wall 18 and the second wall 19 is within the above-described range (0.80 or more and 0.99 or less). This is the same as the rear end portion of the connector 3.

The ratio of the length (L3/L4) of a length L3 in the right-left direction of the central portion in the front-rear direction of the lid 16 (width of the lid 16 corresponding to the first protruding portion 35 and the second protruding portion 36) to a facing length L4 of the central portion in the front-rear direction between the first wall 18 and the second wall 19 (opening width corresponding to the first recessed portion 22 and the second recessed portion 24) is, for example, generally the same (L3/L4≈L1/L2) as the above-described ratio of the length (L1/L2).

The ratio of the length (L5/L6) of a length L5 in the front-rear direction of the first protruding portion 35 (the facing length L5 between the first protruding front surface 52 and the first protruding rear surface 53) to a length L6 in the front-rear direction of the first recessed portion 22 (the facing length L6 between the first recessed front surface 42 and the first recessed rear surface 43) is, for example, generally the same (L5/L6≈L1/L2) as the above-described ratio of the length (L1/L2).

The ratio of the length (L7/L8) of a length L7 in the front-rear direction of the second protruding portion 36 (the facing length L7 between the second protruding front surface 56 and the second protruding rear surface 57) to a length L8 in the front-rear direction of the second recessed portion 24 (the facing length L8 between the second recessed front surface 46 and the second recessed rear surface 47) is, for example, generally the same (L7/L8≈L1/L2) as the above-described ratio of the length (L1/L2).

(Producing Method of Opto-Electric Hybrid Board Connector)

Next, a method for producing the opto-electric hybrid board connector 14 is described by using the connector kit 1.

To produce the connector kit 1, first, the above-described opto-electric hybrid board 2 and the above-described connector 3 are prepared. As shown in FIGS. 3A and 4A, the deformation such as distortion (deflection, warping, or the like) of the opto-electric hybrid board 2 is allowed for the producing method and the material. The above-described distortion includes, for example, distortion such as generally wavy shape when viewed from the side cross-sectional view (ref: FIG. 4A) and generally curved shape when viewed from the front cross-sectional view (ref: FIG. 3A). The above-described curved shape includes, for example, as shown in FIG. 3A, a shape of curving downwardly toward both outer sides in the right-left direction (shape in which the central portion floats compared to both end portions in the right-left direction).

Next, the opto-electric hybrid board 2 is accommodated in the main body 15 of the connector 3. To be specific, the accommodation portion 6 of the opto-electric hybrid board 2 is accommodated (disposed) between the first wall 18 and the second wall 19 of the main body 15 (first step).

The first step is, for example, carried out by automatic operation with a machine or manual operation by an operator. In view of production efficiency, preferably, the first step is carried out by automatic operation with a machine. The steps following the second step are the same as the first step.

In the first step, first, the opto-electric hybrid board 2 is disposed on the bottom wall 17 of the main body 15 in a state in which the electric circuit board 4 faces downwardly and the optical waveguide 5 faces upwardly. In the opto-electric hybrid board 2, based on the above-described deformation, the central portion thereof in the right-left direction may be spaced apart (float) from the bottom surface 20, while the lower ends of both end portions thereof in the right-left direction are in contact with the bottom surface 20 of the bottom wall 17. Each of the two board protruding portions 13 is fitted into the first recessed portion 22 and the second recessed portion 24.

As shown in FIGS. 2, 3B, and 4B, thereafter, the lid 16 is disposed between the first wall 18 and the second wall 9 of the main body 15 (second step).

In the second step, the lid 16 is lowered with respect to the opto-electric hybrid board 2 to be fitted between the first inner-side surface 21 and the second inner-side surface 23.

At the same time, the lid lower surface 33 of the lid 16 is pushed toward the opto-electric hybrid board 2. In this manner, the opto-electric hybrid board 2 is sandwiched between the lid 16 and the bottom wall 17 in the up-down direction. In this manner, the opto-electric hybrid board 2 is positioned with respect to the main body 15.

Then, the entire lower surface of the opto-electric hybrid board 2 (the cover insulating layer 9) in the accommodation portion 6 is in contact with (in plane-contact with) the entire bottom surface 20 of the bottom wall 17. Thus, the accommodation portion 6 has a flat plate shape extending in a plane direction.

Each of both side surfaces in the right-left direction of the opto-electric hybrid board 2 faces the first lower portion 26 and the second lower portion 28 of the main body 15 in the right-left direction.

Meanwhile, each of the first lid side surface 31 and the second lid side surface 32 of the lid 16 faces the first upper portion 27 and the second upper portion 29 of the main body 15 in the right-left direction.

A first gap 37 is formed between the first lid side surface 31 and the first upper portion 27. Furthermore, a second gap 38 is formed between the second lid side surface 32 and the second upper portion 29. The first gap 37 and the second gap 38 are minute space (slack or margin) based on the above-described ratio of the length (L1/L2) (furthermore, L3/L4) of 0.80 or more and 0.99 or less.

The first gap 37 extends along the front-rear direction, and has a shape when viewed from the top corresponding to the first inner-side surface 21 and the first lid side surface 31. The first gap 37 has a generally linear slit shape when viewed from the front cross-sectional view extending from the upper surface of the opto-electric hybrid board 2 upwardly. The first gap 37 is also formed between the first recessed portion 22 and the first protruding portion 35, and thus, the first gap 37 has a generally hat shape having an opening toward the right side when viewed from the top. The first gap 37 is formed based on the above-described ratio of the length (L3/L4, furthermore, L5/L6).

The second gap 38 extends along the front-rear direction, and has a shape when viewed from the top corresponding to the second inner-side surface 23 and the second lid side surface 32. The second gap 38 has a generally linear slit shape when viewed from the front cross-sectional view extending from the upper surface of the opto-electric hybrid board 2 upwardly. The second gap 38 is also formed between the second recessed portion 24 and the second protruding portion 36, and thus, the second gap 38 has a generally hat shape having an opening toward the left side when viewed from the top. The second gap 38 is formed based on the above-described ratio of the length (L3/L4, furthermore, L7/L8).

As shown by a phantom line of FIG. 3B, thereafter, the adhesive 30 is poured into the first gap 37 and the second gap 38 (third step).

The adhesive 30 is, for example, liquid or semi-solid. Preferably, in view of obtaining excellent flowability in the first gap 37 and the second gap 38, the adhesive 30 is liquid. Examples of the adhesive 30 include curable type and pressure-sensitive adhesive type. Preferably, in view of obtaining excellent flowability (excellent flowability at the time of uncuring) and high adhesive properties, a curable type is used.

To be specific, the adhesive 30 is poured into the first gap 37 and the second gap 38 from each of the upper end portions thereof. Then, in the first gap 37, the adhesive 30 flows from the upper end portion to the lower end portion thereof; subsequently, reaches the left end portion of the opto-electric hybrid board 2; spreads between the lid lower surface 33 of the lid 16 and the upper surface of the opto-electric hybrid board 2; and spreads between the bottom surface 20 of the bottom wall 17 and the lower surface of the opto-electric hybrid board 2, while going around the left end portion of the opto-electric hybrid board 2 (not shown). Also, in the second gap 38, the adhesive 30 flows from the upper end portion to the lower end portion thereof; subsequently, reaches the right end portion of the opto-electric hybrid board 2; spreads between the lid lower surface 33 of the lid 16 and the upper surface of the opto-electric hybrid board 2; and spreads between the bottom surface 20 of the bottom wall 17 and the lower surface of the opto-electric hybrid board 2, while going around the right end portion of the opto-electric hybrid board 2 (not shown).

Thereafter, when the adhesive 30 is the curable type, the adhesive 30 is cured.

The opto-electric hybrid board 2 adheres to the main body 15 and the lid 16 (the connector 3) to be fixed by the adhesive 30.

In this manner, the opto-electric hybrid board connector 14 including the opto-electric hybrid board 2 and the connector 3 that accommodates the opto-electric hybrid board 2, and filling the first gap 37 and the second gap 38 with the adhesive 30 is produced.

Thereafter, the core layer 11 in the opto-electric hybrid board connector 14 is optically connected to an optical member (not shown) such as another optical waveguide and optical cable.

In the connector kit 1, the above-described ratio of the length (L1/L2) is 0.99 or less, so that the lid 16 can be surely fitted between the first wall 18 and the second wall 19 by the automatic operation with the machine in particular.

Meanwhile, when the above-described ratio of the length (L1/L2) is below 0.80, as shown in FIG. 14, in the second step, both end portions in the right-left direction of the opto-electric hybrid board 2 cannot be pushed by the lid 16, that is, cannot be sandwiched between the lid 16 and the bottom wall 17. Thus, the core layer 11 in both end portions in the right-left direction of the opto-electric hybrid board 2 deviates upwardly (floats), and thus, the optical connecting accuracy of the core layer 11 of the opto-electric hybrid board 2 is reduced.

On the other hand, in the connector kit 1, the above-described ratio of the length (L1/L2) is 0.80 or more, so that both end portions in the right-left direction of the opto-electric hybrid board 2 can be surely sandwiched between the lid 16 and the bottom wall 17. Thus, floating of both end portions in the right-left direction of the opto-electric hybrid board 2 can be suppressed, and deviation of the above-described core layer 11 can be suppressed, so that the optical connecting accuracy of the opto-electric hybrid board 2 is excellent.

In the method for producing the connector kit 1, in the third step, the adhesive 30 is poured into the first gap 37 and the second gap 38, so that the opto-electric hybrid board 2 can be surely adhesively fixed to the connector 3.

Modified Examples

In the following each of the modified examples, the same reference numerals are provided for members and steps corresponding to each of those in the above-described first embodiment, and their detailed description is omitted. Furthermore, in each of the modified examples, the same function and effect as that of the first embodiment can be achieved unless otherwise specified.

As shown in FIG. 1, in the first embodiment, the opto-electric hybrid board 2 includes the board protruding portion 13. Alternatively, though not shown, for example, the opto-electric hybrid board 2 can be also configured without including the board protruding portion 13. Furthermore, the connector kit 1 can be also configured such that the main body 15 does not include the first recessed portion 22 and the second recessed portion 24, and the lid 16 does not include the first protruding portion 35 and the second protruding portion 36.

In the first embodiment, in the second step, the first gap 37 and the second gap 38 are formed. Alternatively, though not shown, the second step can be also carried out such that the second gap 36 is not formed, while the first gap 37 is formed. The opposite may also be applied.

In the producing method of the first embodiment, the first step and the second step are sequentially carried out. Alternatively, for example, though not shown, the first step and the second step can also be simultaneously carried out. According to the method, along with the lid 16, the opto-electric hybrid board 2 allowing the deformation goes through between the first wall 18 and the second wall 19, and subsequently, the opto-electric hybrid board 2 can be pushed toward the bottom surface 20 of the bottom wall 17, while being sandwiched between the lid 16 and the bottom wall 17.

Although not shown, in addition to the first lower portion 26 and the first upper portion 27, the first inner-side surface 21 can also further have a first upper end portion (not shown) that extends from the upper end edge of the first upper portion 27 upwardly and does not face the first lid side surface 31 of the lid 16 when the lid 16 is disposed between the first wall 18 and the second wall 19. Also, in addition to the second lower portion 28 and the second upper portion 29, the second inner-side surface 23 can further have a second upper end portion (not shown) that extends from the upper end edge of the second upper portion 29 upwardly and does not face the second lid side surface 32 of the lid 16 when the lid 16 is disposed between the first wall 18 and the second wall 19.

In the first embodiment, the opto-electric hybrid board 2 as one example of an optical waveguide member is illustrated. Alternatively, for example, though not shown, the opto-electric hybrid board 2 can also include only the optical waveguide 5 without including the electric circuit board 4.

Second Embodiment

In the second embodiment, the same reference numerals are provided for members and steps corresponding to each of those in the above-described first embodiment, and their detailed description is omitted. In the second embodiment, the same function and effect as that of the first embodiment can be achieved unless otherwise specified.

In the two enlarged views of FIG. 5B, the adhesive 30 is omitted and hatching treatment is not applied so as to clearly show the relative arrangement of the first inner-side surface 21 and the first lid side surface 31, and the relative arrangement of the second inner-side surface 23 and the second lid side surface 32.

As shown in FIGS. 5A to 6, in the second embodiment, all of the first inner-side surface 21, the second inner-side surface 23, the first lid side surface 31, and the second lid side surface 32 incline with respect to the thickness direction (up-down direction).

To be specific, as shown in FIG. 5A, the first inner-side surface 21 and the second inner-side surface 23 incline toward both outer sides in the right-left direction as they extend from both end edges in the right-left direction of the bottom surface 20 upwardly. That is, the first inner-side surface 21 inclines toward the left side as it goes upwardly. The second inner-side surface 23 inclines toward the right side as it goes upwardly. Accordingly, both of the first inner-side surface 21 and the second inner-side surface 23 face upwardly. An inclination X1 of the first inner-side surface 21 with respect to the thickness direction (to be specific, direction perpendicular to the plane direction of the bottom surface 20 of the bottom wall 17) is, for example, the same as an inclination X2 of the second inner-side surface 23 with respect to the thickness direction. The details of the inclination X1 and the inclination X2 are described later.

The first lid side surface 31 and the second lid side surface 32 incline toward both outer sides in the right-left direction as they extend from both end edges in the right-left direction of the lid lower surface 33 upwardly. That is, the first lid side surface 31 inclines toward the left side as it goes upwardly. The second lid side surface 32 inclines toward the right side as it goes upwardly. Accordingly, both of the first lid side surface 31 and the second lid side surface 32 face downwardly. An inclination Y1 of the first lid side surface 31 with respect to the thickness direction (to be specific, direction perpendicular to the plane direction of the lid lower surface 33 of the lid 16) is, for example, the same as an inclination Y2 of the second lid side surface 32 with respect to the thickness direction. The details of the inclination Y1 and the inclination Y2 are described next.

In the second embodiment, the inclination X1 of the first inner-side surface 21 is smaller than the inclination Y1 of the first lid side surface 31 (ref: enlarged view at the left side of FIG. 5B), and the inclination X2 of the second inner-side surface 23 is smaller than the inclination Y2 of the second lid side surface 32 (ref: enlarged view at the right side of FIG. 5B).

To be specific, the ratio (X1/Y1) of the inclination X1 to the inclination Y1 is, for example, below 1, preferably 0.99 or less, more preferably 0.90 or less, and for example, 0.5 or more. A value (difference, Y1−X1) obtained by subtracting the inclination X1 from the inclination Y1 is, for example, above 0 degree, preferably 0.1 degrees or more, more preferably 1 degree or more, further more preferably 5 degrees or more, particularly preferably 10 degrees or more, and for example, 45 degrees or less.

To be specific, the inclination X1 is, for example, above 0 degree, preferably 0.2 degrees or more, more preferably 1 degree or more, and for example, 40 degrees or less, preferably 10 degrees or less. The inclination Y1 is, for example, above 0 degree, preferably 0.5 degrees or more, more preferably 2 degrees or more, and for example, 45 degrees or less, preferably 15 degrees or less.

The inclination X1 in the second embodiment is an angle ($\theta 1$−90 degrees) obtained by subtracting the right angle from the angle $\theta 1$ made between the first inner-side surface 21 and the bottom surface 20. The inclination Y1 in the second embodiment is an angle ($\theta 3$−90 degrees) obtained by subtracting the right angle from the angle $\theta 3$ made between the first lid side surface 31 and the lid lower surface 33. Both of the angle $\theta 1$ and the angle $\theta 3$ are an obtuse angle.

The ratio (X2/Y2) of the inclination X2 to the inclination Y2 is the same as the above-described ratio (X1/Y1). A specific range of the inclination X2 and the inclination Y2 is the same as the description above. The inclination X2 in the second embodiment is an angle ($\theta 2$−90 degrees) obtained by subtracting the right angle from the angle $\theta 2$ made between the second inner-side surface 23 and the bottom surface 20. The inclination Y2 in the second embodiment is an angle ($\theta 4$−90 degrees) obtained by subtracting the right angle from the angle $\theta 4$ made between the second lid side surface 32 and the lid lower surface 33. Both of the angle $\theta 2$ and the angle $\theta 4$ are the obtuse angle.

The above-described ratio of the length (L1/L2) may be within the above-described range in any one point in the thickness direction. For example, all of the central portion, the lower end portion, and the upper end portion in the thickness direction satisfy the above-described ratio of the length (L1/L2), preferably, the central portion in the thickness direction satisfies the above-described ratio of the length (L1/L2).

As referred to FIG. 6, all of the first recessed front surface 42, the first recessed rear surface 43, and the first left surface 44 in the first recessed portion 22 have the above-described inclination X1. All of the first protruding front surface 52, the first protruding rear surface 53, and the first protruding left surface 54 in the first protruding portion 35 have the above-described inclination Y1. Then, the inclination X1 in the first recessed portion 22 and the inclination Y1 in the first protruding portion 35 are within the above-described range.

All of the second recessed front surface 46, the second recessed rear surface 47, and the second right surface 48 in the second recessed portion 24 have the above-described inclination X2. All of the second protruding front surface 56, the second protruding rear surface 57, and the second protruding right surface 58 in the second protruding portion 36 have the above-described inclination Y2. Then, the inclination X2 in the second recessed portion 24 and the inclination Y2 in the second protruding portion 36 are within the above-described range.

As shown in FIGS. 5A to 6, the first wall 18 has a hole 41. The hole 41 is a through hole that passes through the first wall 18 in the right-left direction. The right end edge of the hole 41 is continuous to the first upper portion 27 of the first inner-side surface 21.

As shown in FIG. 5B, the cross-sectional area along the right-left direction of both of the first gap 37 and the second gap 38 that are formed in the second step increases as they get closer to the bottom wall 17. That is, both of the first lid side surface 31 and the first upper portion 27 that define the first gap 37, and the second lid side surface 32 and the second upper portion 29 that define the second gap 38 have a tapered shape in which the facing length thereof in the right-left direction gets closer to each other as it goes upwardly when viewed from the front cross-sectional view.

As shown by an arrow of FIG. 5B, in the third step, the adhesive 30 is poured into the first gap 37 via the hole 41.

Thereafter, as referred to the enlarged view of FIG. 5B, the adhesive 30 is poured into the second gap 38 via the space between the lid 16 and the opto-electric hybrid board 2, and the space between the opto-electric hybrid board 2 and the bottom wall 17. In this manner, the adhesive 30 fills both of the first gap 37 and the second gap 38.

In the connector kit 1, when the adhesive 30 fills the first gap 37 and the second gap 38 via the hole 41, the cross-sectional area along the right-left direction of the first gap 37 and the second gap 38 increases as they get closer to the bottom wall 17, so that a filling amount of the adhesive 30 near the opto-electric hybrid board 2 can be increased. Thus, the opto-electric hybrid board 2 can be more surely adhesively fixed to the main body 15.

In the connector kit 1, all of the first inner-side surface 21, the second inner-side surface 23, the first lid side surface 31, and the second lid side surface 32 incline with respect to the thickness direction. Thus, by disposing the adhesive 30 between the first inner-side surface 21 and the first lid side surface 31 that face each other, and between the second inner-side surface 23 and the second lid side surface 32 that face each other, the adhesive area of the adhesive 30 with each of the first inner-side surface 21, the second inner-side surface 23, the first lid side surface 31, and the second lid side surface 32 can be increased compared to the first embodiment (ref: FIGS. 3A and 3B) in which the above-described surfaces are a straight surface (surface without inclination). Thus, the adhesive force by the adhesive 30 can be improved. As a result, more reliable fixing of the connector 3 with respect to the opto-electric hybrid board 2 can be achieved.

In the connector kit 1, the first inner-side surface 21 and the first lid side surface 31 incline toward the left side as they extend upwardly, so that the contact area of the first inner-side surface 21 and the first lid side surface 31 with the adhesive 30 can be increased, while the lid 16 is surely disposed between the first wall 18 and the second wall 19. Furthermore, the inclination X1 of the first inner-side surface 21 is smaller than the inclination Y1 of the first lid side surface 31, so that the cross-sectional area along the right-left direction of the first gap 37 formed therebetween increases toward the opto-electric hybrid board 2. Thus, the adhesive force by the adhesive 30 can be improved. As a result, the opto-electric hybrid board 2 can be more surely adhesively fixed to the main body 15.

Furthermore, the second inner-side surface 23 and the second lid side surface 32 incline toward the right side as they extend upwardly, so that the contact area of the second inner-side surface 23 and the second lid side surface 32 with the adhesive 30 can be increased, while the lid 16 is surely disposed between the first wall 18 and the second wall 19. Furthermore, the inclination X2 of the second inner-side surface 23 is smaller than the inclination Y2 of the second lid side surface 32, so that the cross-sectional area along the right-left direction of the second gap 38 formed therebetween increases toward the opto-electric hybrid board 2. Thus, the adhesive force by the adhesive 30 can be improved. As a result, the opto-electric hybrid board 2 can be more surely adhesively fixed to the main body 15.

As a result, fitting properties of the lid 16 with respect to the main body 15 are improved, and the opto-electric hybrid board 2 can be more surely adhesively fixed to the main body 15 by the adhesive 30.

Modified Examples

In the following each of the modified examples, the same reference numerals are provided for members and steps corresponding to each of those in the above-described second embodiment, and their detailed description is omitted. Furthermore, in each of the modified examples, the same function and effect as that of the second embodiment can be achieved unless otherwise specified.

Although not shown, the hole 41 can be also provided in both of the first wall 18 and the second wall 19. The first wall 18 and the second wall 19 can be also configured without providing the hole 41.

Although not shown, the second gap 38 can be also formed by the second inner-side surface 23 and the second lid side surface 32 that are parallel with each other and are a straight surface extending straight in the up-down direction as in the first embodiment, while the cross-sectional area of the first gap 37 increases as it gets closer to the bottom wall 17 as in the second embodiment. The opposite may also be applied.

Third Embodiment

In the third embodiment, the same reference numerals are provided for members and steps corresponding to each of those in the above-described first and second embodiments, and their detailed description is omitted. In the third embodiment, the same function and effect as that of the first and second embodiments can be achieved unless otherwise specified.

As shown in FIGS. 7A and 7B, the first lower portion 26, the second lower portion 28, and the bottom surface 20 form a third recessed portion 45 as a recessed portion that is recessed from the first upper portion 27 and the second upper portion 29 downwardly.

The third recessed portion 45 has a shape that is capable of accommodating the opto-electric hybrid board 2, to be specific, has a shape that is cut out into a generally rectangular shape when viewed from the front cross-sectional view downwardly. Both of the first lower portion 26 and the second lower portion 28 are a straight surface that extend straight upwardly from both end edges in the right-left direction of the bottom surface 20.

To be specific, each of the angle θ1 made between the first lower portion 26 and the bottom surface 20, and the angle θ2 made between the second lower portion 28 and the bottom surface 20 is the right angle, and the first lower portion 26 and the second lower portion 28 are parallel with each other. A depth of the third recessed portion 45 (length in the up-down direction of the first lower portion 26 and the second lower portion 28) is generally the same as a thickness of the opto-electric hybrid board 2.

The first lower portion 26 and the first upper portion 27 form a bending surface (are not flush), and a first ridgeline 59 that protrudes toward the right side is formed on the border therebetween. The second lower portion 28 and the second upper portion 29 form the bending surface, and a second ridgeline 60 that protrudes toward the left side is formed on the border therebetween.

In the first step, the opto-electric hybrid board 2 is fitted into the third recessed portion 45. At this time, the first lower portion 26 and the second lower portion 28 face the opto-electric hybrid board 2 in the right-left direction.

In the second step, the opto-electric hybrid board 2 at the inside of the third recessed portion 45 is sandwiched between the lid 16 and the bottom wall 17.

In the connector kit 1, in the first step, the opto-electric hybrid board 2 can be accommodated in the third recessed portion 34 to be fitted therein so that the first lower portion 26 (one example of a first continuous surface) and the second lower portion 28 (one example of a second continuous surface) face the opto-electric hybrid board 2 in the right-left direction. Thus, in the second step, the opto-electric hybrid board 2 can be sandwiched between the lid 16 and the bottom wall 17 in a state in which the opto-electric hybrid board 2 is fitted into the main body 15 in advance. Thus, the opto-electric hybrid board 2 can be more surely fixed to the connector 3.

Modified Examples

In the following each of the modified examples, the same reference numerals are provided for members and steps corresponding to each of those in the above-described third embodiment, and their detailed description is omitted. Furthermore, in each of the modified examples, the same function and effect as that of the third embodiment can be achieved unless otherwise specified.

Figure 8:
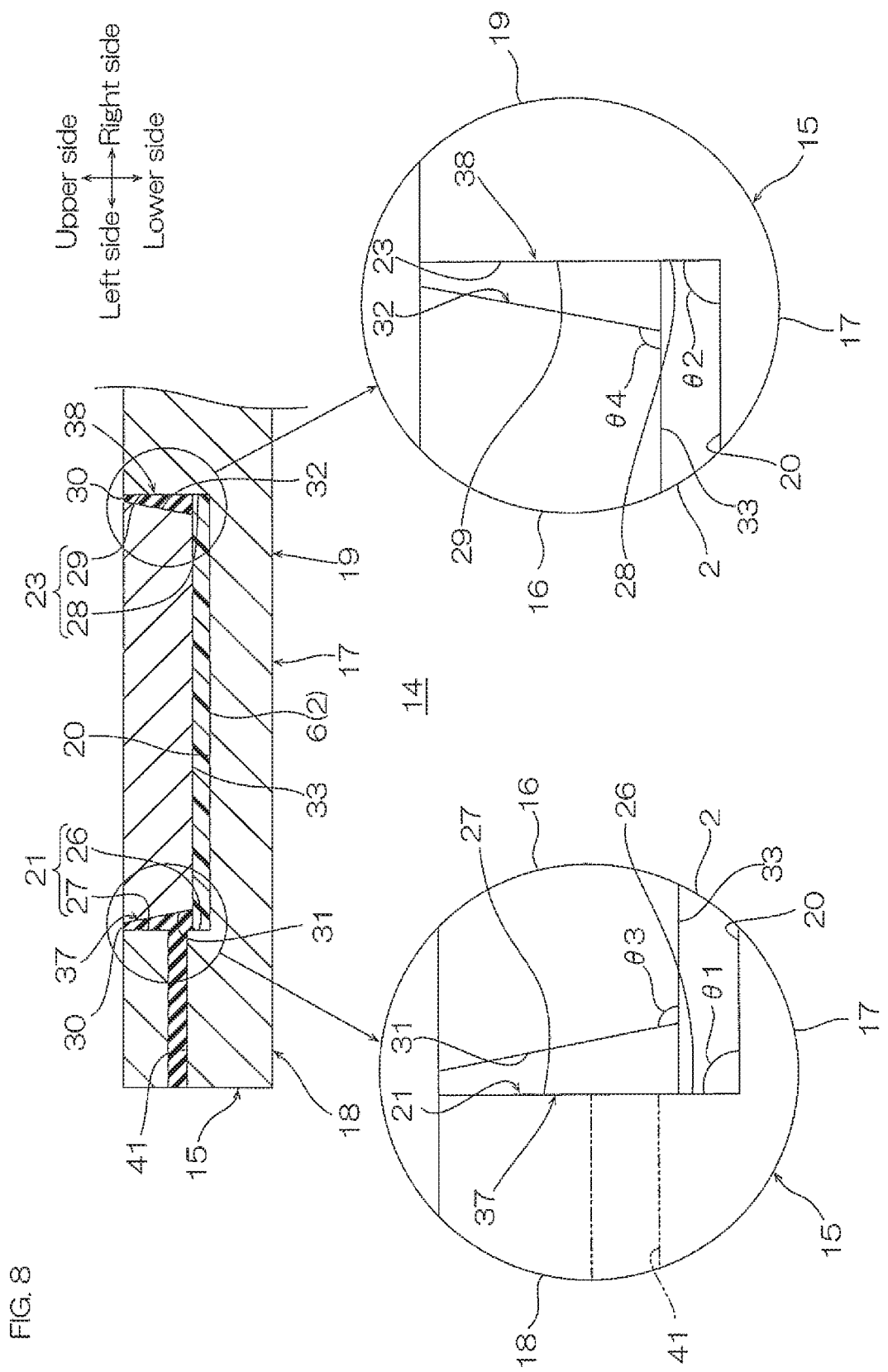
FIG. 8 shows a cross-sectional view of a modified example of the optical waveguide member connector of the third embodiment.

In the two enlarged views of FIG. 8, the adhesive 30 is omitted and the hatching treatment is not applied so as to clearly show the relative arrangement of the first inner-side surface 21 and the first lid side surface 31, and the relative arrangement of the second inner-side surface 23 and the second lid side surface 32.

As shown in FIG. 8, each of the first upper portion 27 and the second upper portion 29 is a straight surface extending in the up-down direction. That is, the first inner-side surface 21 and the second inner-side surface 23 are a straight surface extending along the up-down direction. Both of the angle θ1 and the angle θ2 are the right angle.

Fourth Embodiment

In the fourth embodiment, the same reference numerals are provided for members and steps corresponding to each of those in the above-described first to third embodiments, and their detailed description is omitted. In the fourth embodiment, the same function and effect as that of the first to third embodiments can be achieved unless otherwise specified.

As shown in FIGS. 9A and 9B, the inclination X1 of the first inner-side surface 21 is larger than the inclination Y1 of the first lid side surface 31. The inclination X2 of the second inner-side surface 23 is larger than the inclination Y2 of the second lid side surface 32.

To be specific, the ratio (X1/Y1) of the inclination X1 to the inclination Y1 is, for example, above 1, preferably 1.01 or more, more preferably 1.1 or more, and for example, 1.5 or less. A value (difference, X1−Y1) obtained by subtracting the inclination Y1 from the inclination X1 is, for example, above 0 degree, preferably 0.1 degrees or more, more preferably 1 degree or more, further more preferably 5 degrees or more, particularly preferably 10 degrees or more, and for example, 45 degrees or less.

To be specific, the inclination X1 is, for example, above 0 degree, preferably 0.5 degrees or more, more preferably 2 degrees or more, and for example, 45 degrees or less, preferably 15 degrees or less. The inclination Y1 is, for example, above 0 degree, preferably 0.2 degrees or more, more preferably 1 degree or more, and for example, 40 degrees or less, preferably 10 degrees or less.

The ratio (X2/Y2) of the inclination X2 to the inclination Y2 is the same as the above-described ratio (X1/Y1). The specific range of the inclination X2 and the inclination Y2 is the same as the description above.

In the second step, when the lid 16 is disposed between the first inner-side surface 21 and the second inner-side surface 23, the first gap 37 and the second gap 38 are formed.

The cross-sectional area along the right-left direction of both of the first gap 37 and the second gap 38 that are formed in the second step decreases as they get closer to the bottom wall 17. That is, both of the first lid side surface 31 and the first upper portion 27 that define the first gap 37, and the second lid side surface 32 and the second upper portion 29 that define the second gap 38 have a tapered shape in which the facing length thereof in the right-left direction goes away from each other as it goes upwardly when viewed from the front cross-sectional view.

In the connector kit 1, in the second step, the cross-sectional area of each of the upper end edges of the first gap 37 and the second gap 38 can be set large, and as a result, as shown by the phantom line of FIG. 9B, the adhesive 30 can be easily and surely poured from the above-described upper end edges.

Modified Examples

In the following each of the modified examples, the same reference numerals are provided for members and steps corresponding to each of those in the above-described third embodiment, and their detailed description is omitted. Furthermore, in each of the modified examples, the same function and effect as that of the third embodiment can be achieved unless otherwise specified.

In each of the two enlarged views of FIGS. 10 to 13, the adhesive 30 is omitted and the hatching treatment is not applied so as to clearly show the relative arrangement of the first inner-side surface 21 and the first lid side surface 31, and the relative arrangement of the second inner-side surface 23 and the second lid side surface 32.

As shown in FIG. 10, each of the first lid side surface 31 and the second lid side surface 32 is a straight surface extending straight upwardly from each of both end edges in the right-left direction of the lid lower surface 33. The angle θ3 made between the first lid side surface 31 and the lid lower surface 33 is the right angle, and the angle θ4 made between the second lid side surface 32 and the lid lower surface 33 is the right angle. The first lid side surface 31 and the second lid side surface 32 are parallel with each other.

Figure 11:
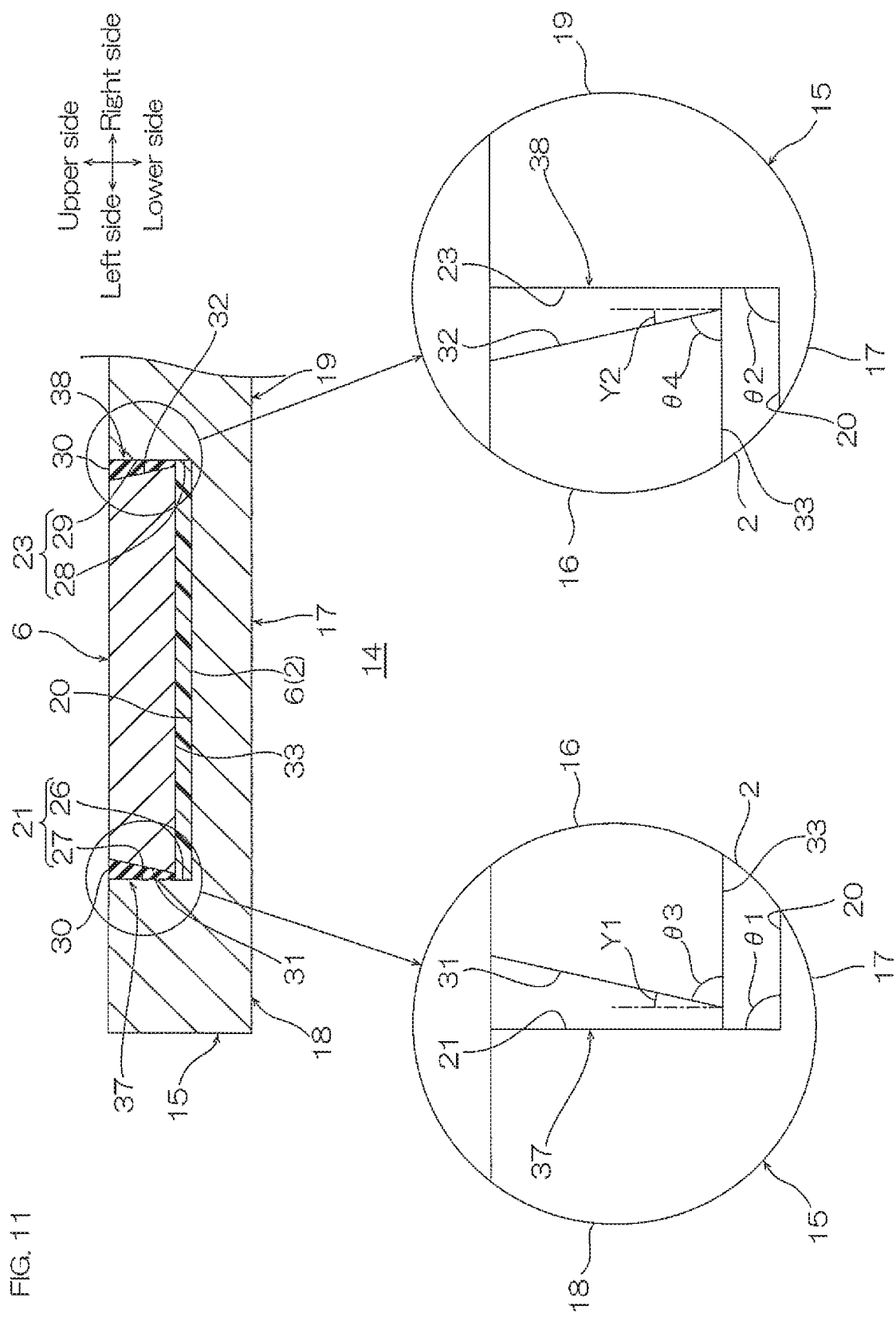
FIG. 11 shows a front cross-sectional view of a modified example of the optical waveguide member connector of the third embodiment.

As shown in FIG. 11, each of the first inner-side surface 21 and the second inner-side surface 23 is a straight surface extending straight upwardly from each of both end edges in the right-left direction of the bottom surface 20.

Meanwhile, the first lid side surface 31 and the second lid side surface 32 incline inwardly in the plane direction as they go upwardly. To be specific, the first lid side surface 31 inclines toward the right side as it goes upwardly. The second lid side surface 32 inclines toward the left side as it goes upwardly. In the modified example shown in FIG. 11, the inclination Y1 of the first lid side surface 31 is a value (90 degrees−θ3) obtained by subtracting the angle θ3 from the right angle. The angel θ3 is an acute angle. The inclination Y2 of the second lid side surface 32 is a value (90 degrees−θ4) obtained by subtracting the angle θ4 from the right angle. The angel θ4 is the acute angle.

Figure 12:
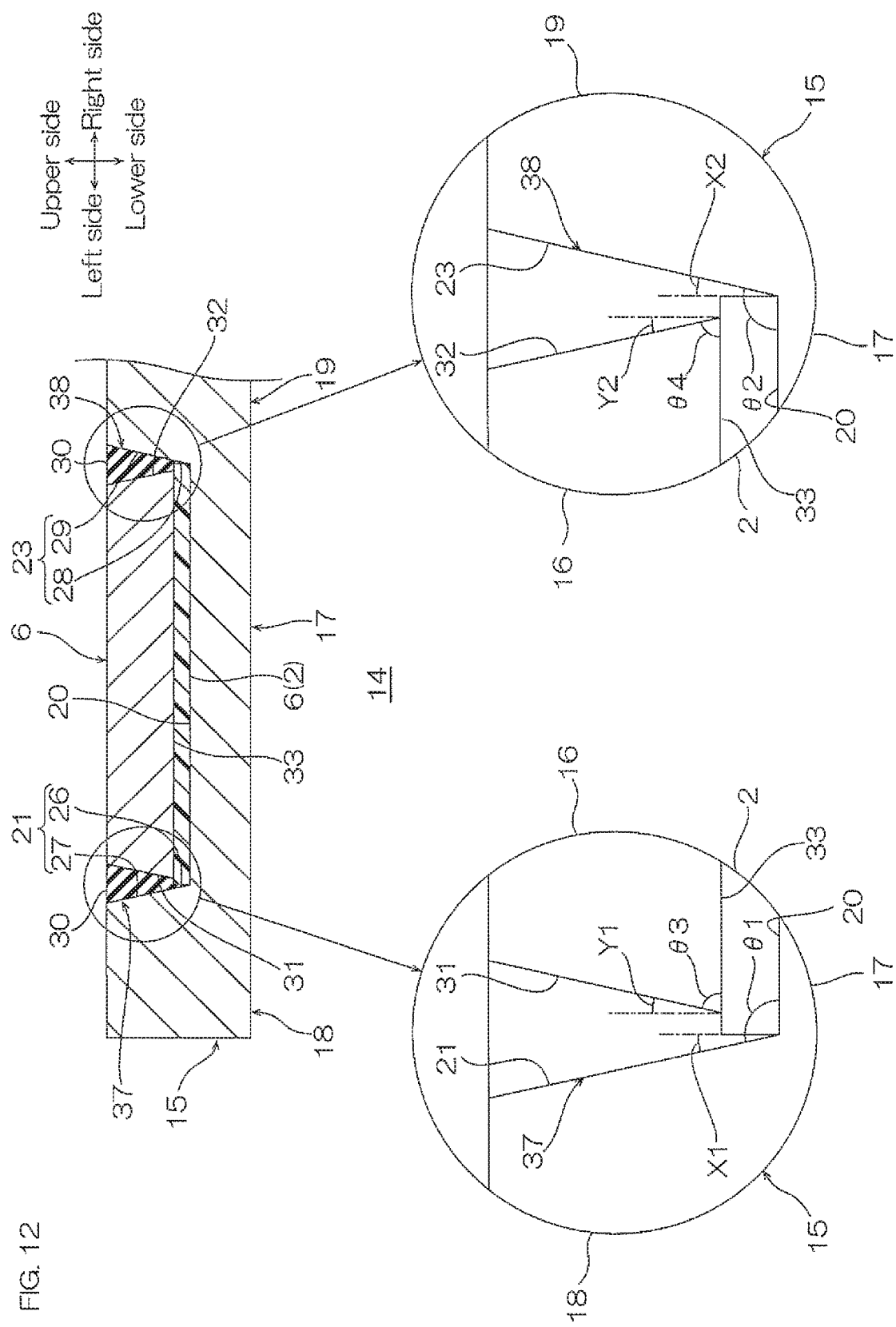
FIG. 12 shows a front cross-sectional view of a modified example of the optical waveguide member connector of the third embodiment.

As shown in FIG. 12, an inclination direction of the first inner-side surface 21 may be different from that of the first lid side surface 31. In this case, both of the angle θ3 and the angle θ4 are the acute angle, while both of the angle θ1 and the angle θ2 are the obtuse angle.

Figure 13:
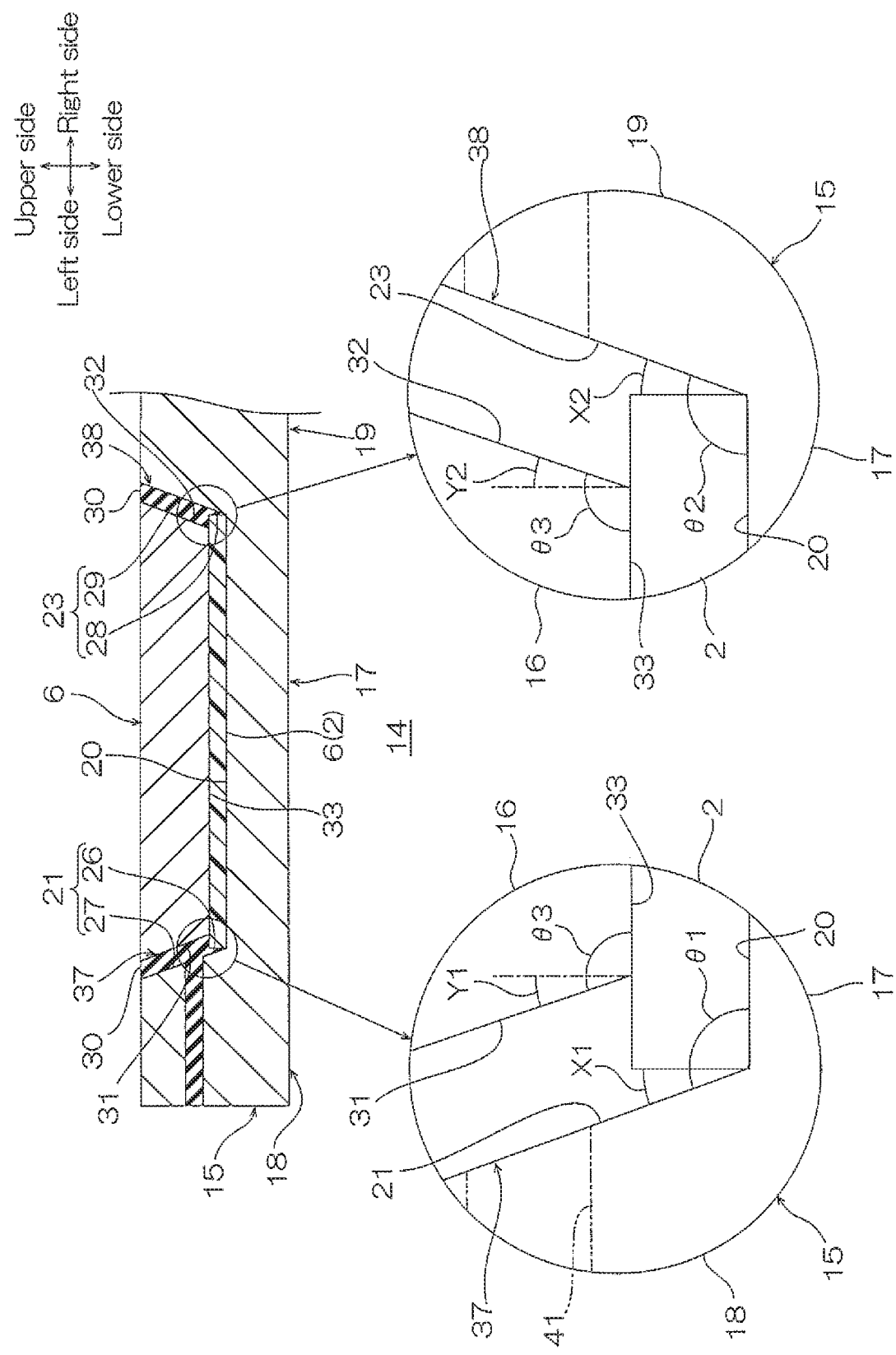
FIG. 13 shows a front cross-sectional view of a modified example of the optical waveguide member connector of the third embodiment.

As shown in FIG. 13, the inclination X1 of the first inner-side surface 21 may be the same as the inclination Y1 of the first lid side surface 31, and the inclination X2 of the second inner-side surface 23 may be the same as the inclination Y2 of the second lid side surface 32. To be specific, the angle θ1 is the same as the angle θ3, and the angle θ2 is the same as the angle θ4. When the lid 16 is disposed between the first wall 18 and the second wall 19, the first inner-side surface 21 is parallel with the first lid side surface 31, and the second inner-side surface 23 is parallel with the second lid side surface 32.

Each of the embodiments and each of the modified examples described above can be appropriately used in combination. For example, of the first to third embodiments, and the modified example of these, one can be applied for the first inner-side surface 21 and the first lid side surface 31, and another can be also applied for the second inner-side surface 23 and the second lid side surface 32.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The optical waveguide member connector kit of the present invention is used as an opto-electric hybrid board connector kit.

DESCRIPTION OF REFERENCE NUMERALS

1 Connector kit (optical waveguide member connector kit)
2 Opto-electric hybrid board
3 Connector (opto-electric hybrid board connector)
5 Optical waveguide
15 Main body
16 Lid
17 Bottom wall
18 First wall
19 Second wall
21 First inner-side surface
23 Second inner-side surface
30 Adhesive
31 First lid side surface
32 Second lid side surface
37 First gap
38 Second gap
45 Third recessed portion
L1 Length in right-left direction of lid
L2 Facing length between first wall and second wall
X1 Inclination of first facing surface
X2 Inclination of second facing surface
Y1 Inclination of third facing surface
Y2 Inclination of fourth facing surface

The invention claimed is:

1. An optical waveguide member connector kit comprising:
   an optical waveguide member including an optical waveguide and
   a connector accommodating the optical waveguide member, wherein
   the connector includes
   a main body having a bottom wall, and a first wall and a second wall that extend from the bottom wall toward one side in a thickness direction of the bottom wall and face each other at spaced intervals therebetween, and
   a lid disposed between the first wall and the second wall and sandwiching the optical waveguide member with the bottom wall when the optical waveguide member is accommodated in the connector; and
   a ratio (L1/L2) of a length L1 in a facing direction of the lid to a facing length L2 between the first wall and the second wall is 0.80 or more and 0.99 or less;
   the facing direction of the lid is defined as a direction orthogonal to a longitudinal direction in which the optical waveguide member extends, and extending between the first wall and the second wall in the connector;
   when the lid is disposed between the first wall and the second wall,
   each of the first wall and the second wall has a first facing surface and a second facing surface facing the lid;
   the lid has a third facing surface facing the first facing surface and a fourth facing surface facing the second facing surface;
   at least one of the first facing surface, the second facing surface, the third facing surface, and the fourth facing surface inclines with respect to the thickness direction; and
   the first facing surface and the third facing surface incline outwardly in the facing direction as they extend toward one side in the thickness direction, and an inclination X1 of the first facing surface with respect to the thickness direction is smaller than an inclination Y1 of the third facing surface with respect to the thickness direction, and/or
   the second facing surface and the fourth facing surface incline outwardly in the facing direction as they extend toward one side in the thickness direction, and an inclination X2 of the second facing surface with respect to the thickness direction is smaller than an inclination Y2 of the fourth facing surface with respect to the thickness direction.

2. The optical waveguide member connector kit according to claim 1, wherein
   when the lid is disposed between the first wall and the second wall, a first gap is formed between the lid and the first wall, and the cross-sectional area along the facing direction of the first gap increases as it gets closer to the bottom wall and/or
   when the lid is disposed between the first wall and the second wall, a second gap is formed between the lid and the second wall, and the cross-sectional area along the facing direction of the second gap increases as it gets closer to the bottom wall.

3. The optical waveguide member connector kit according to claim 1, wherein
   when the lid is disposed between the first wall and the second wall, a first gap is formed between the lid and the first wall, and the cross-sectional area along the facing direction of the first gap decreases as it gets closer to the bottom wall and/or when the lid is disposed between the first wall and the second wall, a second gap is formed between the lid and the second wall, and the cross-sectional area along the facing direction of the second gap decreases as it gets closer to the bottom wall.

4. The optical waveguide member connector kit according to claim 1, wherein
the first facing surface and the second facing surface incline outwardly in the facing direction as they extend toward one side in the thickness direction;
the first wall has a first continuous surface continuous to the bottom surface of the bottom wall and the first facing surface, and along the thickness direction;
the second wall has a second continuous surface continuous to the bottom surface of the bottom wall and the second facing surface, and along the thickness direction;
the first continuous surface, the second continuous surface, and the bottom surface form a recessed portion that is recessed from the first facing surface and the second facing surface toward the other side in the thickness direction; and
when the optical waveguide member is accommodated in the recessed portion, the first continuous surface and the second continuous surface face the optical waveguide member in the facing direction.

5. A method for producing an optical waveguide member connector comprising:
in the optical waveguide member connector kit according to claim 1, a first step of accommodating the optical waveguide member between the first wall and the second wall of the main body,
a second step of sandwiching the optical waveguide member between the lid and the bottom wall, and
a third step of pouring an adhesive into a first gap formed between the lid and the first wall and/or a second gap formed between the lid and the second wall.

* * * * *